(12) United States Patent
Onishi et al.

(10) Patent No.: US 6,698,875 B2
(45) Date of Patent: Mar. 2, 2004

(54) INK SET AND INK CARTRIDGE AND RECORDING METHOD, RECORDING MATERIAL AND RECORDING APPARATUS

(75) Inventors: Hiroyuki Onishi, Nagano (JP); Yuko Yamamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/800,255

(22) Filed: Mar. 5, 2001

(65) Prior Publication Data

US 2002/0005884 A1 Jan. 17, 2002

(30) Foreign Application Priority Data

Mar. 6, 2000 (JP) .................................... P.2000-059922
Apr. 11, 2000 (JP) .................................... P.2000-108859

(51) Int. Cl.⁷ ................................................. B41J 2/01
(52) U.S. Cl. ...................... 347/100; 347/95; 106/31.13
(58) Field of Search ........................... 342/100, 96, 98, 342/101, 105; 106/31.58, 31.13, 31.6, 31.27; 347/100, 101, 96, 95

(56) References Cited

FOREIGN PATENT DOCUMENTS

| EP | 0692527 | | 1/1996 | |
|---|---|---|---|---|
| EP | 0831135 A1 | * | 9/1997 | ............ C09D/11/00 |
| EP | 0831135 A1 | * | 3/1998 | ............ C09D/11/00 |
| EP | 0831135 | | 3/1998 | |
| EP | 0841185 | | 5/1998 | |
| EP | 0879857 A2 | * | 11/1998 | ............ C09D/11/00 |
| EP | 0896037 | | 2/1999 | |
| EP | 0952196 | | 10/1999 | |
| EP | 0952196 A1 | * | 10/1999 | ............ C09D/11/00 |
| JP | 10-338830 A | | 12/1998 | |
| JP | 11-048462 A | | 2/1999 | |
| JP | 11105308 | | 4/1999 | |
| JP | 11-105308 A | | 4/1999 | |
| JP | 7-132619 A | | 5/1999 | |

OTHER PUBLICATIONS

English language version of Office Action.
Japanese language version of Office Action.
English Translation of JP11105308 dated Apr. 20, 1999.

* cited by examiner

Primary Examiner—Stephen D. Meier
Assistant Examiner—Manish Shah
(74) Attorney, Agent, or Firm—Ladas & Parry

(57) ABSTRACT

The present invention provides an ink set and ink cartridge which allow color printing of an image having an excellent color reproduction with a plurality of inks using an ink jet recording apparatus and provide a good discoloration resistance, color developability and water fastness, a recording method using the ink set and ink cartridge, a recorded material thus obtained, and a recording apparatus therefor. The ink set according to the invention is an "ink set including a dye ink and a pigment ink in combination, characterized in that there are contained a plurality of inks having the same hue but different densities for at least one hue and at least one of the inks having a low density includes a pigment incorporated therein as a colorant". Thus, the use of an "ink having a low density (light-colored ink)" including a pigment incorporated therein as a colorant makes it possible to provide improvements in properties such as light fastness and water fastness in a low image density range (highlight range) in particular. Further, the ink cartridge, recording method, recorded material thus obtained, and recording apparatus therefor according to the invention are characterized by the use of the foregoing ink set.

27 Claims, 4 Drawing Sheets

BLACK INK CARTRIDGE

COLOR INK CARTRIDGE

Figure 1:
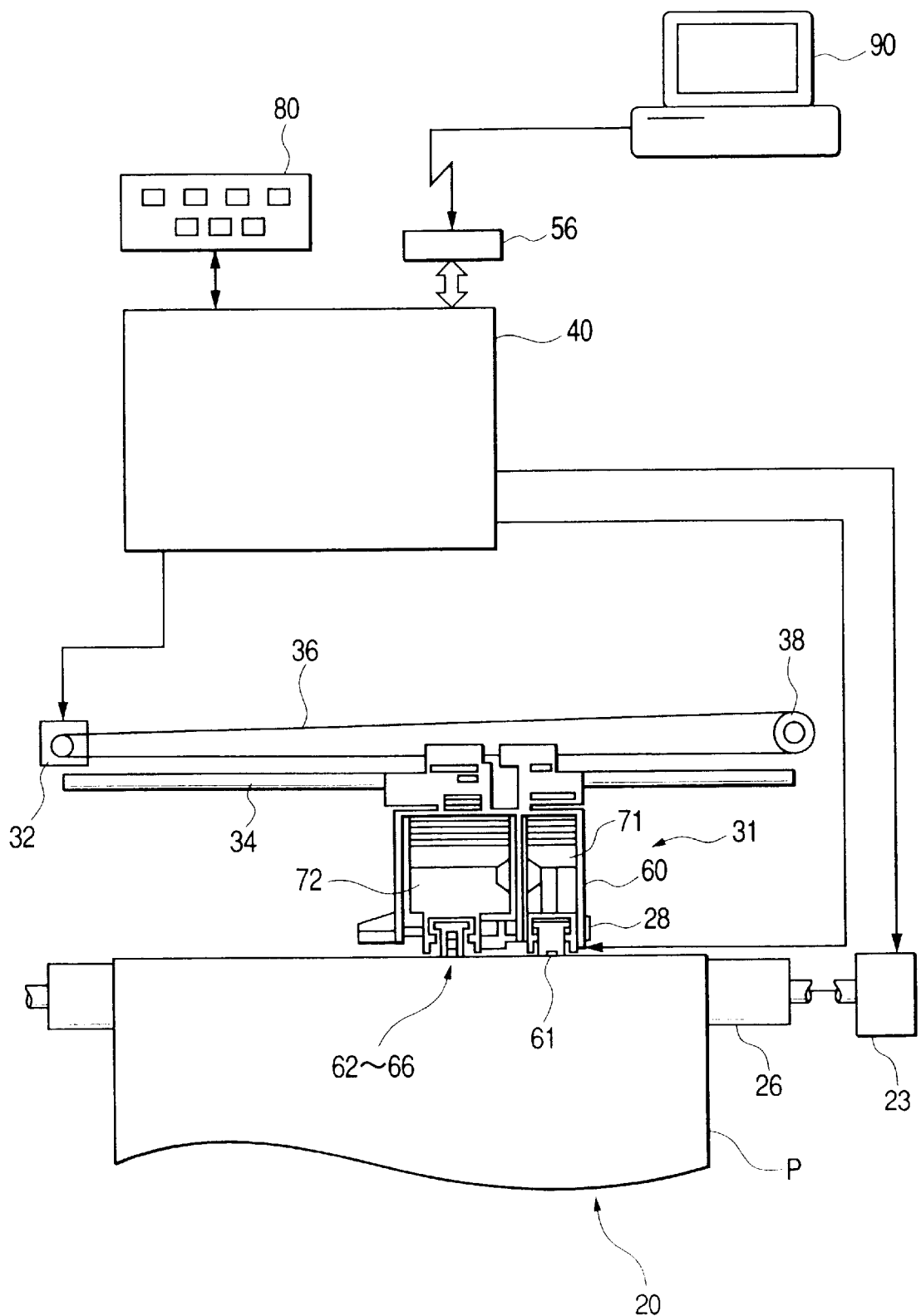

INK SET AND INK CARTRIDGE AND RECORDING METHOD, RECORDING MATERIAL AND RECORDING APPARATUS

FIELD OF THE INVENTION

The present invention relates to an ink set, an ink cartridge, and a recording method using same, and a recording material and recording apparatus therefor. More particularly, the present invention relates to an ink set and ink cartridge which allow color printing of an image having an excellent color reproduction with a plurality inks using an ink jet recording apparatus and provide a good discoloration resistance and color developability, a recording method using the ink set and ink cartridge, a recorded material thus obtained, and a recording apparatus therefor.

BACKGROUND OF THE INVENTION

As well known, an ink jet recording method is a printing method which comprises allowing ink droplets to fly so that they are attached to a recording medium such as paper to effect printing. This printing method allows fast and easy printing of a high resolution and quality image using an inexpensive apparatus. In particular, in the art of color printing with a plurality of inks (magenta, cyan, yellow inks), this printing method has been recently under technical development to provide an image forming method substitute for photography.

An ink normally comprises water as a main component having a colorant component, a wetting agent for preventing clogging such as glycerin, a penetrating agent, etc. incorporated therein. As the plurality of color inks to be used in the ink jet recording method there are used a dye ink (ink comprising a "dye" incorporated therein as a colorant) and a pigment ink (ink comprising a "pigment" incorporated therein as a colorant).

(Problem 1 of the Background Art)

As the colorant to be incorporated in the dye ink there is used particularly a "water-soluble dye" from the standpoint of advantages of high image quality such as high color saturation and color reproducibility, abundance in colorants which can be used, solubility in water, reliability in resistance to clogging, and ability to represent a color having a good transparency on a recording medium.

However, the dye ink is disadvantageous in that it is inferior to the pigment ink in respect to properties such as light fastness and water fastness. This difficulty becomes remarkable particularly in a low image density range (so-called highlight range).

On the other hand, the pigment ink is advantageous in that it allows printing of characters and images with little bleeding as compared with the dye ink. Further, a pigment ink is excellent in light fastness and water fastness as compared with a dye. In recent years, the use of a pigment as a colorant for ink jet recording ink has been studied for the purpose of improving light fastness and water fastness.

However, the pigment ink is disadvantageous in that it is inferior to the dye ink in respect to color developability. Further, since a pigment is normally insoluble in water, in order to incorporate a pigment in an aqueous ink, the pigment has to be uniformly dispersed in water in the form of mixture with a resin called dispersant to provide the resulting ink with a prolonged reliability. However, when all colors are provided by pigments, it is disadvantageous in that a desired dispersion stability can hardly be secured.

Further, unlike one obtained with an aqueous ink comprising a dye incorporated therein, a printed matter obtained with an aqueous ink comprising a pigment incorporated therein has some pigment left on the surface thereof and thus can hardly resist scratching. Moreover, when all colors are provided by pigments, the resulting inks exhibit a poor transparency (color developability) and hue and hence a low color reproducibility.

In an attempt to eliminate these difficulties and disadvantages, the combination of a dye ink and a pigment ink has heretofore been proposed. For example, JP-A-5-148441 (The term "JP-A" as used herein means an "unexamined published Japanese patent application") discloses a "recording liquid suitable for ink jet printer, and ink jet recording method using same" involving the use of specific "dye and pigment" as colorant for magenta ink. Further, JP-A-5-155004 discloses a "color image forming method by ink jet recording method" involving the use of a specific dye as colorant for yellow ink and a specific pigment as colorant for magenta ink and cyan ink. Moreover, JP-A-5-155005 discloses a "color image forming method by ink jet recording method" involving the use of a specific dye as colorant for yellow ink and cyan ink and a specific pigment as colorant for magenta ink.

However, none of the approaches disclosed in the above cited patents can eliminate the foregoing difficulties and disadvantages. In particular, the problem that a dye ink is remarkably disadvantageous in properties such as light fastness and water fastness in a low image density range (highlight range) cannot be solved.

(Problem 2 of the Background Art)

Among the color dye inks (yellow, magenta, cyan), the magenta ink is particularly disadvantageous in that it exhibits a deteriorated light fastness. Thus, when irradiated with light, the resulting image exhibits an ill-balanced hue and thus shows a remarkably deteriorated quality. Further, discoloration is accelerated not only in single magenta color but also in blue color represented by magenta and cyan in combination to cause drastic deterioration of image quality.

Further, when inks having the same hue but different densities (dark-colored and light-colored inks) are used to reduce the graininess on a range from a low image density range (highlight range) to middle tone range, a photograph-like image can be obtained. However, the light-colored ink exhibits a far low light fastness than the dark-colored ink). The light-colored magenta ink is remarkable in this tendency. Further, the area having magenta and cyan in mixture can undergo rapid discoloration due to deterioration by light. This in presumably attributed to harmful radicals or active oxygen (singlet oxygen), etc. produced by light.

(Problem 3 of the Background Art)

As the foregoing "ink jet recording medium" on which image recording is effected with a water-soluble dye there is known an "ink jet recording medium having a porous ink-receiving layer provided on a substrate" which allows printing of an image having an excellent water fastness and a high quality that can dry quickly.

However, a recorded material obtained by ejecting the foregoing water-soluble dye onto an ink jet recording medium having a porous ink-receiving layer provided an a substrate is subject to discoloration due to gases such as ozone ($O_3$), nitrogen oxide ($NO_x$) and sulfur oxide ($SO_x$) contained in the air when the dye contained in the ink as a colorant is brought into contact with the atmosphere because the ink-receiving layer is porous. In particular, among the color dye inks (yellow, magenta, cyan), some cyan dyes, though having a high water fastness and light fastness, exhibit a low gas resistance (C.I. direct blue 86, 199, etc.). Thus, there arises a problem that an image obtained with such a cyan dye having a copper phthalocyanine skeleton undergoes deterioration due to oxidation and reduction by gases and hence an ill-balanced hue that causes the image to show a remarkable deterioration. This problem becomes remarkable particularly in a low image density range (highlight range).

SUMMARY OF THE INVENTION

The inventors made extensive studies of an ink jet recording method using color inks, particularly a plurality of inks having different densities but the same hue (dark-colored ink and light-colored ink). As a result, it was found that the combination of specific pigment ink (at least one of light-colored inks is an ink containing a pigment as a colorant) and dye inks makes it possible to provide a high image quality, a high rub fastness and a high light fastness at the same time (A high quality image and a high rub fastness can be realized and discoloration can be effectively inhibited.). The present invention has thus been completed.

In other words, the present invention has been firstly worked out in the light of the foregoing "problems 1 to 3 of the background art". An object of the invention is to provide an ink set which gives a printed image having an excellent color reproduction and exhibits a good discoloration resistance and color developability (hereinafter referred to as "first object").

In order to accomplish the first object of the invention, the first ink set of the invention is an "ink set comprising a dye ink and a pigment ink in combination, characterized in that at least one hue contains a plurality of inks having the same hue but different densities for at least one hue and at least one of the inks having the same hue has a low density and comprises a pigment incorporated therein as a colorant". Thus, the use of a "ink having a low density (light-colored ink)" containing a pigment as a colorant makes it possible to improve various properties such as light fastness and water fastness particularly in a low image density region (highlight region).

Secondly, the present invention has been worked out in the light of the foregoing "problems 1 to 3 of the background art", particularly the foregoing "problem 2 of the background art". Another object of the invention is to provide an ink set and an ink cartridge for giving a printed image having excellent color reproduction and rub fastness which undergoes no deterioration due to discoloration, particularly of blue color represented by magenta and cyan in combination, not to mention of magenta alone, to provide a recorded material having an excellent light fastness, and an ink jet recording method using the ink set and ink cartridge, an recorded material thus obtained, and a recording apparatus therefor (hereinafter referred to as "second object").

In order to accomplish the second object of the invention, the second ink act of the invention is an "ink having a plurality of magenta inks having the same hue but different densities for at least one hue, characterized in that at least light-colored magenta ink among the plurality of magenta inks comprises a pigment incorporated therein as a colorant and the other inks of a different hue each comprise a dye incorporated as a colorant". In this arrangement, an effect can be exerted of realizing an ink jet recording method of forming a color image having a high quality and rub fastness which undergoes no discoloration due to light.

The ink cartridge for accomplishing the second object of the invention is an "ink cartridge comprising a plurality of magenta inks having different densities and other inks received integrally as independently at least partly therein, characterized in that at least light-colored magenta ink among the plurality of magenta inks contains a pigment as a colorant and the other inks of a different hue contain a dye as a colorant". In this arrangement, an effect can be exerted of allowing printing of a color image having a high quality and rub fastness which undergoes no discoloration and giving an ease of handling of ink.

The ink jet recording method, recorded material thus obtained and recording apparatus therefor for accomplishing the second object of the invention are characterized by the use of the foregoing second ink set. In this arrangement, an effect can be certainly exerted of forming an image having a good quality, improving rub fastness and inhibiting discoloration. Further, the mounting of the ink cartridge on a cartridge can be made easily.

As mentioned above, in accordance with the invention for accomplishing the second object of the invention, color printing is effected using a plurality of magenta inks having different densities and other inks wherein at least light-colored magenta ink among the plurality of magenta inks comprises a pigment incorporated therein as a colorant and the other inks comprise a dye incorporated therein as a colorant, making it possible to exert an effect of keeping image quality such an color reproduction good, rendering the image resistant to scratch and making up for defects in light fastness of magenta color and blue color comprising magenta and cyan in combination to effectively inhibit discoloration. As the dark-colored ink (dark-colored cyan and dark-colored magenta) there is preferably used a dye ink. Such a dye ink is also advantageous in that a wider range of color reproduction can be realized.

Thirdly, the present invention has been worked out in the light of the foregoing "problems 1 to 3 of the background art", particularly the foregoing "problem 3 of the background art". A further object of the invention is to provide an ink set and ink cartridge capable of providing an image having a high quality, a high water fastness and a high light fastness as well as a high gas resistance upon recording on an ink jet recording medium having a porous ink-receiving layer provided on a substrate, and an ink jet recording method using the ink set and ink cartridge, a recorded material thus obtained and a recording apparatus therefor (hereinafter referred to as "third object").

In order to accomplish the third object, the ink set of the invention is an "ink comprising a plurality of cyan inks having the same hue but different densities wherein at least light-colored cyan ink among the plurality of cyan inks comprises a pigment incorporated therein as a colorant and the other inks of a different hue comprise a dye incorporated therein as a colorant". The ink set is an "ink set for recording on an ink jet recording medium having a porous ink-receiving layer provided on a substrate". In this arrangement, the following effects can be exerted.

A cyan ink comprising a dye incorporated therein as a colorant undergoes discoloration due to gases such as ozone ($O_3$), nitrogen oxide ($NO_x$) and sulfur oxide ($SO_x$) more remarkably than other dye color inks (magenta, yellow, etc.). However, a plurality of cyan inks having different densities wherein at least light-colored cyan ink comprises a "pigment" incorporated therein as a colorant undergoes suppressed discoloration. The use of this "ink set comprising a light-colored cyan ink containing a pigment" makes it possible to exert an effect of providing an image having a high quality, a high water fastness and a high light fastness as well as a high gas resistance upon recording on an ink jet recording medium having a porous ink-receiving layer provided an a substrate.

In the foregoing "ink set comprising a light-colored cyan ink containing a pigment", the pigment is preferably C.I. pigment blue 15:3. C.I. pigment blue 15:3 is a colorant having a high water fastness, a high light fastness and a high gas resistance and thus particularly can provide an image having a high water fastness, a high light fastness and a high gas resistance.

As the colorants for the foregoing light-colored cyan ink there are preferably used a dye and a pigment in combination. The combined use of a pigment and a dye makes it possible to provide a better color developability than single use of pigment and thus obtain a high quality image.

The use of two or more cyan inks having different densities makes it possible to certainly realize a color containing cyan and thus obtain a high precision image.

The ink cartridge for accomplishing the foregoing third object is an "ink cartridge comprising a plurality of cyan inks having different densities and other inks received integrally or independently at least partly therein, characterized in that at least light-colored cyan ink among the plurality of cyan inks contains a pigment as a colorant and the other inks of a different hue contain a dye as a colorant". In this arrangement, an effect can be exerted of providing an image having a high quality, a high water fastness and a high light fastness as well as a high gas resistance as mentioned above.

In the foregoing ink cartridge, the pigment to be incorporated in the light-colored cyan ink is preferably C.I. pigment blue 15:3, and as the colorants to be incorporated in the light-colored cyan ink there are preferably used a pigment and a dye in combination. In this arrangement, an ink cartridge can be provided having the same effect as mentioned above.

The ink jet recording method, recorded material thus obtained and recording apparatus therefor for accomplishing the foregoing third object are characterized by the use of the foregoing third ink set. In this arrangement, an ink jet recording method, recorded material thus obtained and recording apparatus therefor can be provided having the same effect as mentioned above.

Fourthly, the present invention has been worked out in the light of the foregoing "problems 1 to 3 of the background art", particularly the foregoing "problems 2 and 3 of the background art". A further object of the invention is to provide an ink set and ink cartridge which can provide an image having a high quality, a high water fastness and a high light fastness as well as a high gas resistance, an ink jet recording method using the ink set and ink cartridge, a recorded material thus obtained, and a recording apparatus therefor (hereinafter referred to as "fourth object").

In order to accomplish the foregoing forth object, the fourth ink set of the invention is an "ink comprising a plurality of magenta inks and cyan inks each having the same hue but different densities, characterized in that at least light-colored magenta ink and cyan ink among the plurality of magenta inks and cyan inks each comprise a pigment incorporated therein as a colorant and the other inks each comprise a dye incorporated therein as a colorant". In this arrangement, an ink set for accomplishing the foregoing second and third objects and having both the effects exerted by the foregoing second and third ink sets in combination can be provided.

The ink cartridge for accomplishing the foregoing fourth object is an "ink cartridge comprising a plurality of magenta inks and cyan inks each having different densities but the same hue, characterized in that at least light-colored magenta ink and cyan ink of the plurality of magenta inks and cyan inks each comprise a pigment incorporated therein as a colorant and the others inks each comprise a dye incorporated therein as a colorant".

Further, the ink jet recording method, recorded material thus obtained, and recording apparatus therefor for accomplishing the foregoing fourth object are characterized by the use of the foregoing fourth ink set.

As mentioned above, the invention for accomplishing the foregoing fourth object involves the use of a plurality of inks having the same hue the light-colored ink (particularly the ink having the lowest density in the same hue) among which comprises a pigment incorporated therein, making it possible to improve the light fastness in a low image density range where the light-colored ink is mainly used. Further, since the dark-colored ink (ink having the highest density) comprises a dye incorporated therein, a sharp image having a good transparency can be obtained in a high image density region.

The term "ink comprising a pigment incorporated therein" as used herein is meant to include both "ink comprising a pigment alone incorporated therein" and "ink comprising a pigment and a dye incorporated therein in combination".

BRIEF DESCRIPTION OF THE INVENTION

Figure 2:
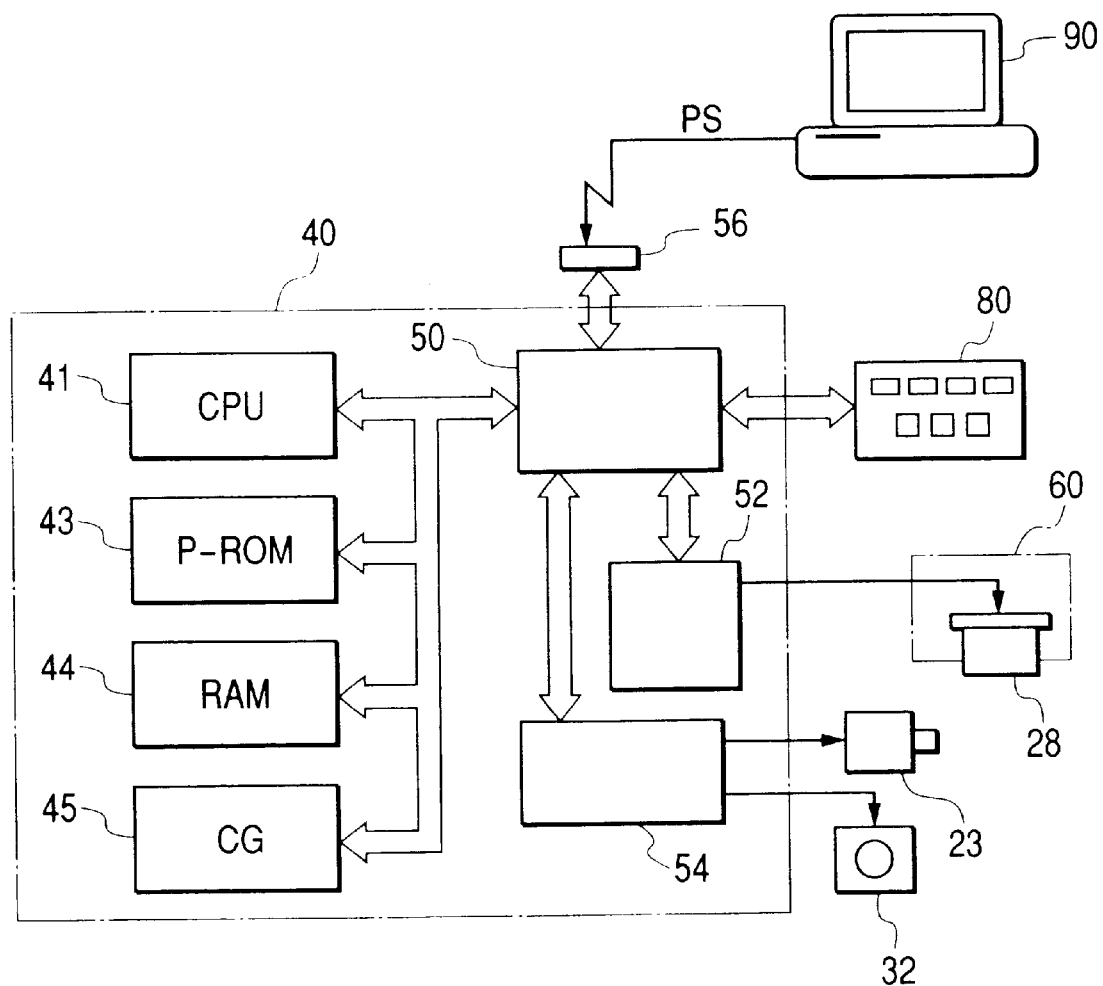
Figure 3:
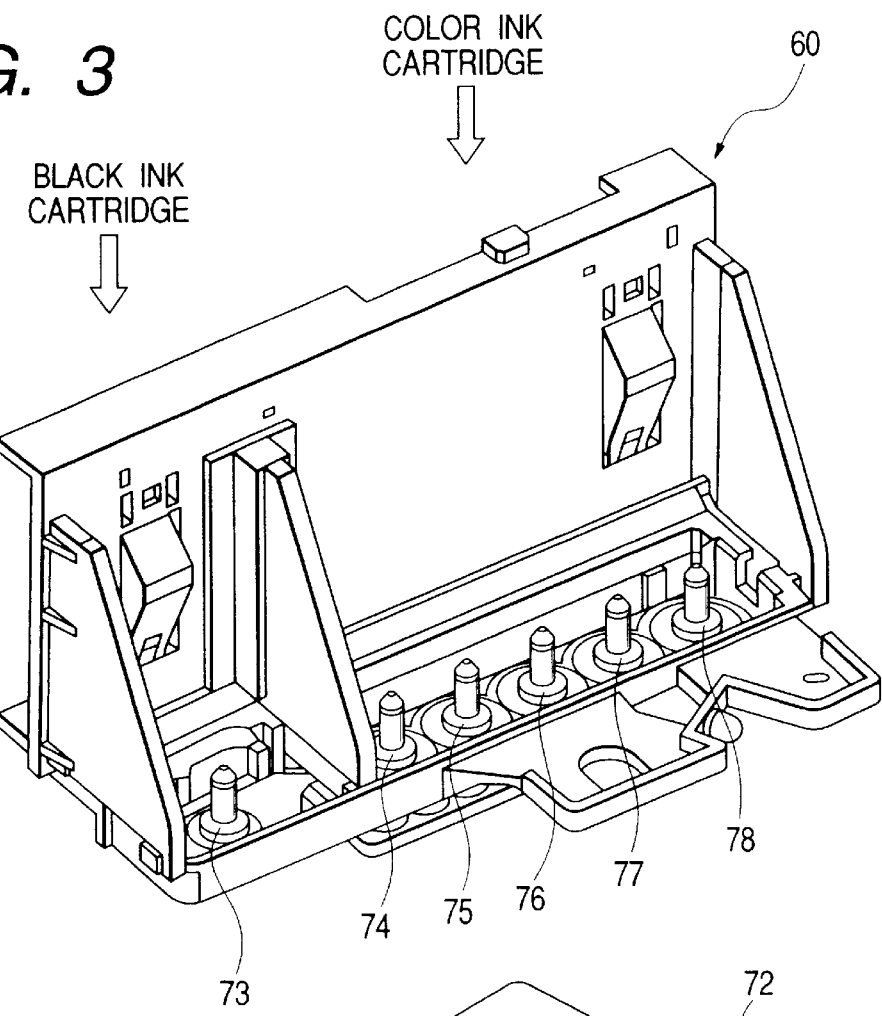
Figure 4:
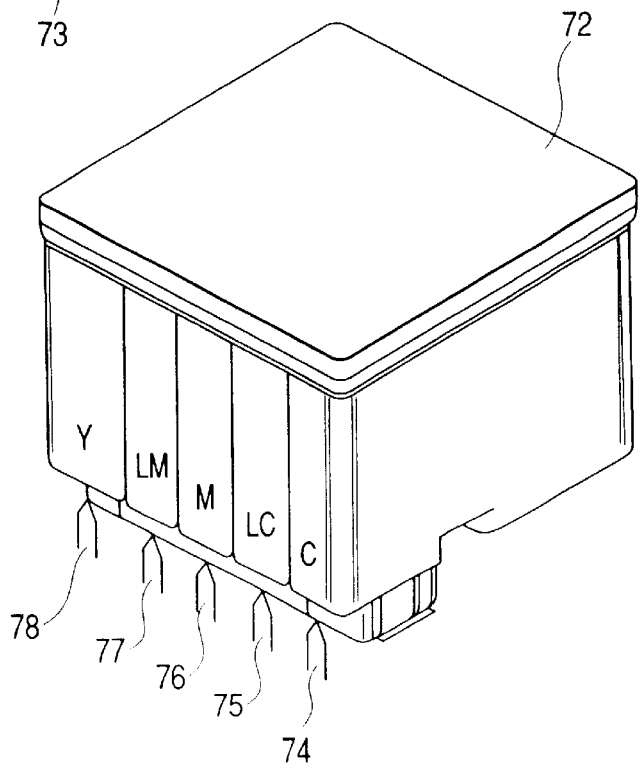
Figure 5:
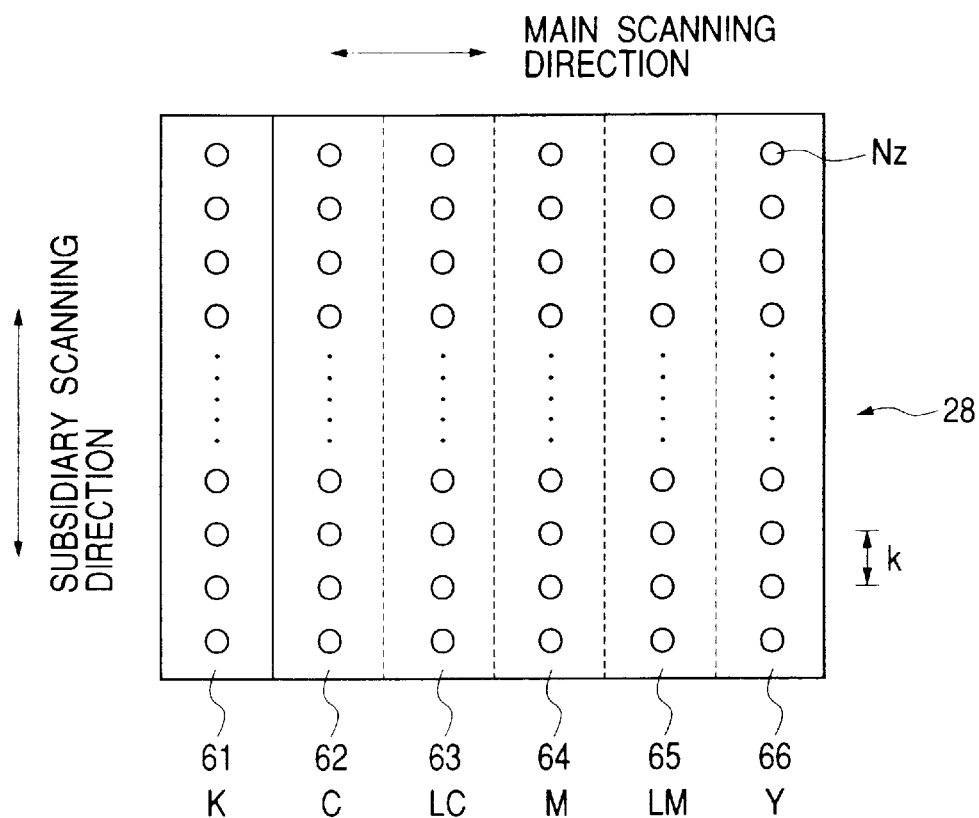

FIG. 1 is a schematic diagram illustrating the configuration of a printing system, FIG. 2 is a block diagram illustrating the internal configuration of a control circuit 40, FIG. 3 is a perspective view of a printing head unit 60, FIG. 4 is a perspective view of a color ink cartridge 72, and FIG. 5 is a diagram illustrating 6 sets of nozzle array 61 to 66 provided on a printing head 28.

Figure 6:
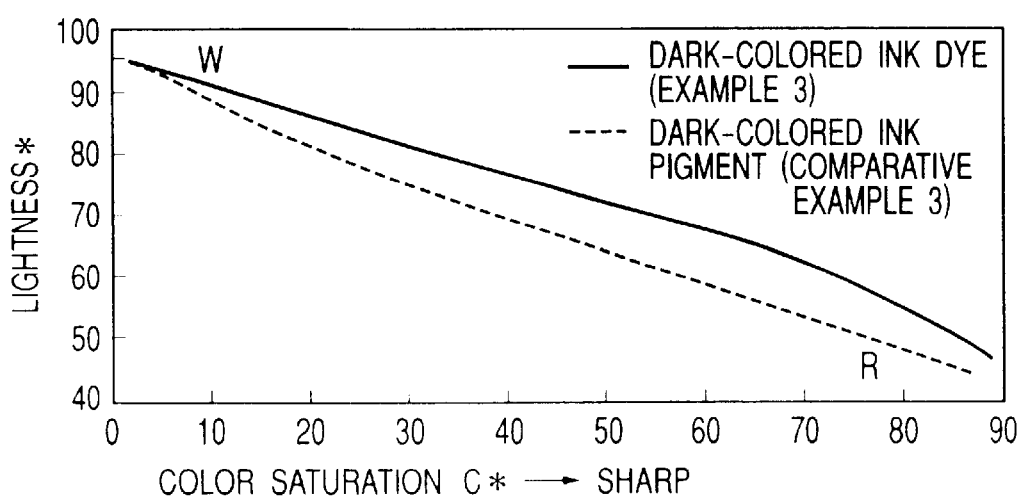

FIG. 6 is a diagram illustrating the difference in color reproduction between the case where a dye is used as a coloring material for dark-colored ink and the case where a pigment is used as a coloring material for dark-colored ink in Example 3 and Comparative Example 3 of the third embodiment of implication of the present invention.

In FIGS. 1 to 5, the reference numeral 20 indicates a recording apparatus, the reference numeral 23 indicates a paper feed motor, the reference numeral 26 indicates a platen, the reference numeral 28 indicates a printing head, the reference numeral 31 indicates a carriage, the reference numeral 32 indicates a carriage motor, the reference numeral 34 indicates a sliding axis, the reference numeral 36 indicates a driving belt, the reference numeral 38 indicates a pulley, the reference numeral 40 indicates a control circuit, the reference numeral 41 indicates CPU, the reference numeral 43 indicates a programmable ROM (P-ROM), the reference numeral 44 indicates RAM, the reference numeral 45 indicates a character generator (CG), the reference numeral 50 indicates I/F dedicated circuit, the reference numeral 52 indicates a head drive circuit, the reference numeral 54 indicates a motor drive circuit, the reference numeral 56 indicates a connector, the reference numeral 60 indicates a printing head unit, the reference numerals 61 to 66 each indicate a nozzle array, the reference numeral 71 indicates a black ink cartridge, the reference numeral 72 indicates a color ink cartridge, the reference numerals 73 to 78 each indicate an inlet pipe, the reference numeral 80 indicates an operation panel, and the reference numeral 90 indicates a computer. The symbol P indicates an ink jet recording medium, the symbol PS indicates a printing signal, and the symbol Nz indicates a nozzle.

DETAILED DESCRIPTION OF THE INVENTION

The ink set of the invention is an "ink set comprising a dye ink and a pigment ink in combination, characterized in that at least one hue ink contains a plurality of inks having different densities but the same hue and at least one of the inks having a low density comprises a pigment incorporated therein as a colorant" as mentioned above.

Preferred embodiments of the ink set of the invention include the following first to third embodiments.

(Ink Set According to the First Embodiment of Implication of the Present Invention)

The ink set according to the first embodiment of implication of the present invention is the foregoing second ink set, i.e., "ink set comprising a plurality of magenta inks having the same hue but different densities, characterized in that at least light-colored magenta ink among the plurality of magenta inks comprises a pigment incorporated therein as a colorant and the other inks of a different hue each comprise a dye incorporated therein as a colorant". Specific examples of the ink set according to the first embodiment of implication of the present invention include the following ink sets a) to g).

a) An ink set comprising a dark-colored magenta ink, a light-colored magenta ink, a cyan ink and a yellow ink, characterized in that the colorant for the light-colored magenta ink is a pigment and the colorant for the other inks is a dye.

b) An ink set comprising a dark-colored magenta ink, a light-colored magenta ink, a dark-colored cyan ink, light-colored cyan ink and a yellow ink, characterized in that the colorant for the light-colored magenta ink is a pigment and the colorant for the other inks is a dye.

c) An ink set comprising a dark-colored magenta ink, a light-colored magenta ink, a dark-colored cyan ink, light-colored cyan ink, a dark-colored yellow ink and a light-colored yellow ink, characterized in that the colorant for the light-colored magenta ink is a pigment and the colorant for the other inks is a dye.

d) An ink set comprising a dark-colored magenta ink, a light-colored magenta ink, a cyan ink, and a yellow ink, characterized in that the colorant for the dark-colored magenta ink and light-colored magenta ink is a pigment and the colorant for the other inks is a dye.

e) An ink set comprising a dark-colored magenta ink, a light-colored magenta ink, a dark-colored cyan ink, a light-colored cyan ink, and a yellow ink, characterized in that the colorant for the dark-colored magenta ink and light-colored magenta ink is a pigment and the colorant for the other inks is a dye.

f) An ink set comprising a dark-colored magenta ink, a light-colored magenta ink, a dark-colored cyan ink, a light-colored cyan ink, a dark-colored yellow, and a light-colored yellow ink, characterized in that the colorant for the dark-colored magenta ink and light-colored magenta ink is a pigment and the colorant for the other inks is a dye.

g) The ink set according to any one of items d) to f) above, wherein the colorants for the dark-colored magenta ink and light-colored magenta ink are a pigment and a dye in combination.

(Ink Set According to the Second Embodiment of Implication of the Present Invention)

The ink set according to the second embodiment of implication of the present invention is the foregoing third ink set, i.e., "ink set comprising a plurality of cyan inks having the same hue but different densities, characterized in that at least light-colored cyan ink among the plurality of cyan inks comprises a pigment incorporated therein as a colorant and the other inks of a different hue each comprise a dye incorporated therein as a colorant". Specific examples of the ink set according to the second embodiment of implication of the present invention include the following ink sets h) to l).

h) An ink set comprising a magenta ink, a dark-colored cyan ink, a light-colored cyan ink, and a yellow ink, characterized in that the colorant for the light-colored cyan ink is a pigment and the colorant for the other inks is a dye.

i) An ink set comprising a dark-colored magenta ink, a light-colored magenta ink, a dark-colored cyan ink, a light-colored cyan ink, and a yellow ink, characterized in that the colorant for the light-colored cyan ink is a pigment and the colorant for the other inks is a dye.

j) An ink set comprising a dark-colored magenta ink, a light-colored magenta ink, a dark-colored cyan ink, a light-colored cyan ink and a yellow ink, characterized in that the colorant for the dark-colored cyan ink and light-colored cyan ink is a pigment and the colorant for the other inks is a dye.

k) An ink set comprising a dark-colored magenta ink, a light-colored magenta ink, a dark-colored cyan ink, a light-colored cyan ink, a dark-colored yellow ink, and a light-colored yellow ink, characterized in that the colorant for the dark-colored cyan ink and light-colored cyan ink is a pigment and the colorant for the other inks is a dye.

l) The ink set according to any one of items j) and k) above, wherein the colorants for the dark-colored cyan ink and the light-colored cyan ink are a pigment and a dye.

(Ink Set According to the Third Embodiment of Implication of the Present Invention)

The ink set according to the third embodiment of implication of the present invention is the foregoing fourth ink set, i.e., "ink set comprising a plurality of magenta inks and cyan inks having the same hue but different densities, characterized in that at least light-colored magenta ink and light-colored cyan ink among the plurality of magenta inks and cyan inks each comprise a pigment incorporated therein as a colorant and the other inks each comprise a dye incorporated therein as a colorant". Specific examples of the ink set according to the third embodiment of implication of the present invention include the following ink sets m) and n).

m) An ink set comprising a dark-colored magenta ink, a light-colored magenta ink, a dark-colored cyan ink, a light-colored cyan ink, and a yellow ink, characterized in that the colorant for the light-colored cyan ink and light-colored cyan ink is a pigment and the colorant for the other inks is a dye.

n) An ink set comprising a dark-colored magenta ink, a light-colored magenta ink, a dark-colored cyan ink, a light-colored cyan ink, and a yellow ink, characterized in that the colorants for the light-colored magenta ink and light-colored cyan ink are a pigment and a dye and the colorant for the other ink is a dye.

Specific examples of the foregoing ink sets a) to n) are set forth in Table 1 below.

TABLE 1

Specific examples of ink sets according to the
first to third embodiments of implication of the present invention

| Embodiments of implication of the invention | | Magenta | | | Cyan | | | Yellow | | |
|---|---|---|---|---|---|---|---|---|---|---|
| | | | Two kinds having different densities | | | Two kinds having different densities | | | Two kinds having different densities | |
| | | One kind | Dark-colored ink | Light-colored ink | One kind | Dark-colored ink | Light-colored ink | One kind | Dark-colored ink | Light-colored ink |
| First embodiment | a | — | Dye | Pigment | Dye | — | — | Dye | — | — |
| | b | — | Dye | Pigment | — | Dye | Dye | Dye | — | — |
| | c | — | Dye | Pigment | — | Dye | Dye | — | Dye | Dye |
| | d | — | Pigment | Pigment | Dye | — | — | Dye | — | — |
| | e | — | Pigment | Pigment | — | Dye | Dye | Dye | — | — |
| | f | — | Pigment | Pigment | — | Dye | Dye | — | Dye | Dye |
| | g | — | (*1) | Pigment + dye | — | (Dye) | | — | (Dye) | |
| Second embodiment | h | Dye | — | — | — | Dye | Pigment | Dye | — | — |
| | i | — | Dye | Dye | — | Dye | Pigment | Dye | — | — |
| | j | — | Dye | Dye | — | Pigment | Pigment | Dye | — | — |
| | k | — | Dye | Dye | — | Pigment | Pigment | — | Dye | Dye |
| | l | — | (Dye) | | — | (*2) | Pigment + dye | — | (Dye) | |
| Third embodiment | m | — | Dye | Pigment | — | Dye | Pigment | Dye | — | — |
| | n | — | Dye | Pigment + dye | — | Dye | Pigment + dye | Dye | — | — |

(*1) The pigments for the dark-colored magenta ink according to any one of the first embodiments d) to f) are a pigment and a dye.
(*2) The pigments for the dark-colored cyan ink according to any one of the first embodiments j) and k) are a pigment and a dye.

The ink sets according to the foregoing first to third embodiments of implication of the present invention are free of black ink but may comprise a black ink having a black dye or pigment as a colorant. The ink sets according to the foregoing first to third embodiments of implication of the invention each comprise from 4 to 6 sets of colors, but the present invention is not limited thereto. For example these ink sets each may comprise 2 sets of colors or 7 or more sets of colors.

The ink cartridges according to the first to third embodiments of implication of the invention comprise the various inks of ink sets according to the foregoing first to third embodiments (particularly ink sets according to items a) to n) above) received therein integrally or independently at least partly.

The various inks to be used in the ink sets and ink cartridges according to the foregoing first to third embodiments of implication of the present invention will be described hereinafter.

[Specific Examples of Colorants (Pigment, Dye) to be used in the Invention]

The colorants (pigment, dye) to be used in the invention will be exemplified as follows.

Examples of the pigment to be used in the magenta ink include C.I. pigment red 5, C.I. pigment red 7, C.I. pigment red 12, C.I. pigment red 48 (Ca), C.I. pigment red 48 (Mn), C.I. pigment red 57 (Ca), C.I. pigment red 112, C.I. pigment red 122, and C.I. pigment red 209.

Examples of the dye to be used in the magenta ink include C.I. direct red 2, C.I. direct red 4, C.I. direct red 9, C.I. direct red 23, C.I. direct red 26, C.I. direct red 31, C.I. direct red 39, C.I. direct red 62, C.I. direct red 63, C.I. direct red 72, C.I. direct red 75, C.I. direct red 76, C.I. direct red 79, C.I. direct red 80, C.I. direct red 81, C.I. direct red 83, C.I. direct red 84, C.I. direct red 89, C.I. direct red 92, C.I. direct red 95, C.I. direct red 111, C.I. direct red 173, C.I. direct red 184, C.I. direct red 207, C.I. direct red 211, C.I. direct red 212, C.I. direct red 214, C.I. direct red 218, C.I. direct red 221, C.I. direct red 223, C.I. direct red 224, C.I. direct red 225, C.I. direct red 226, C.I. direct red 227, C.I. direct red 232, C.I. direct red 233, C.I. direct red 240, C.I. direct red 241, C.I. direct red 242, C.I. direct red 243, C.I. direct red 247, C.I. acid red 35, C.I. acid red 42, C.I. acid red 52, C.I. acid red 57, C.I. acid red 62, C.I. acid red 80, C.I. acid red 82, C.I. acid red 111, C.I. acid red 114, C.I. acid red 118, C.I. acid red 119, C.I. acid red 127, C.I. acid red 128, C.I. acid red 131, C.I. acid red 143, C.I. acid red 151, C.I. acid red 154, C.I. acid red 158, C.I. acid red 249, C.I. acid red 254, C.I. acid red 257, C.I. acid red 261, C.I. acid red 263, C.I. acid red 266, C.I. acid red 289, C.I. acid red 299, C.I. acid red 301, C.I. acid red 305, C.I. acid red 336, C.I. acid red 337, C.I. acid red 361, C.I. acid red 396, C.I. acid red 397, C.I. reactive red 3, C.I. reactive red 13, C.I. reactive red 17, C.I. reactive red 19, C.I. reactive red 21, C.I. reactive red 22, C.I. reactive red 22, C.I. reactive red 23, C.I. reactive red 24, C.I. reactive red 29, C.I. reactive red 35, C.I. reactive red 37, C.I. reactive red 40, C.I. reactive red 41, C.I. reactive red 43, C.I. reactive red 45, C.I. reactive red 49, C.I. reactive red 55, C.I. basic red 12, C.I. basic red 13, C.I. basic red 14, C.I. basic red 15, C.I. basic red 18, C.I. basic red 22, C.I. basic red 23, C.I. basic red 24, C.I. basic red 25, C.I. basic red 27, C.I. basic red 29, C.I. basic red 35, C.I. basic red 36, C.I. basic red 38, C.I. basic red 39, C.I. basic red 45, and C.I. basic red 46.

Examples of the pigment to be used in the cyan ink include C.I. pigment blue 15, C.I. pigment blue 15:1, C.I. pigment blue 15:2, C.I. pigment blue 15:3, C.I. pigment blue 16, C.I. pigment blue 18, C.I. pigment blue 25, C.I. pigment blue 60, C.I. pigment blue 65, and C.I. pigment blue 66. Among these pigments, C.I. pigment blue 15:3 is a pigment having a high water fastness, a high light fastness and a high gas resistance and thus is preferably used particularly as a colorant for the light-colored cyan ink to be used in the second embodiment of implication of the present invention. The use of this pigment makes it possible to provide an image having a high water fastness, a high light fastness and a high gas resistance.

Examples of the dye to be used in the cyan ink include C.I. direct blue 1, C.I. direct blue 10, C.I. direct blue 15, C.I. direct blue 22, C.I. direct blue 25, C.I. direct blue 55, C.I. direct blue 67, C.I. direct blue 68, C.I. direct blue 71, C.I. direct blue 76, C.I. direct blue 77, C.I. direct blue 78, C.I. direct blue 80, C.I. direct blue 84, C.I. direct blue 86, C.I. direct blue 87, C.I. direct blue 90, C.I. direct blue 98, C.I. direct blue 106, C.I. direct blue 108, C.I. direct blue 109, C.I. direct blue 151, C.I. direct blue 156, C.I. direct blue 158, C.I. direct blue 159, C.I. direct blue 160, C.I. direct blue 168, C.I. direct blue 189, C.I. direct blue 192, C.I. direct blue 193, C.I. direct blue 194, C.I. direct blue 199, C.I. direct blue 200, C.I. direct blue 201, C.I. direct blue 202, C.I. direct blue 203, C.I. direct blue 207, C.I. direct blue 211, C.I. direct blue 213, C.I. direct blue 214, C.I. direct blue 218, C.I. direct blue 225, C.I. direct blue 229, C.I. direct blue 236, C.I. direct blue 237, C.I. direct blue 244, C.I. direct blue 248, C.I. direct blue 249, C.I. direct blue 251, C.I. direct blue 252, C.I. direct blue 264, C.I. direct blue 270, C.I. direct blue 280, C.I. direct blue 288, C.I. direct blue 289, and C.I. direct blue 291. Among these dyes, C.I. direct blue 199 is preferably used. Specific other examples of the dye to be used in the cyan ink include C.I. acid blue 9, C.I. acid blue 25, C.I. acid blue 40, C.I. acid blue 41, C.I. acid blue 62, C.I. acid blue 72, C.I. acid blue 76, C.I. acid blue 78, C.I. acid blue 80, C.I. acid blue 82, C.I. acid blue 92, C.I. acid blue 106, C.I. acid blue 112, C.I. acid blue 113, C.I. acid blue 120, C.I. acid blue 127:1, C.I. acid blue 129, C.I. acid blue 138, C.I. acid blue 143, C.I. acid blue 175, C.I. acid blue 181, C.I. acid blue 205, C.I. acid blue 207, C.I. acid blue 220, C.I. acid blue 221, C.I. acid blue 230, C.I. acid blue 232, C.I. acid blue 247, C.I. acid blue 258, C.I. acid blue 260, C.I. acid blue 264, C.I. acid blue 271, C.I. acid blue 277, C.I. acid blue 278, C.I. acid blue 279, C.I. acid blue 280, C.I. acid blue 288, C.I. acid blue 290, and C.I. acid blue 326.

Examples of the dye to be used in the yellow ink include C.I. direct yellow 8, C.I. direct yellow 9, C.I. direct yellow 11, C.I. direct yellow 12, C.I. direct yellow 27, C.I. direct yellow 28, C.I. direct yellow 29, C.I. direct yellow 33, C.I. direct yellow 35, C.I. direct yellow 39, C.I. direct yellow 41, C.I. direct yellow 44, C.I. direct yellow 50, C.I. direct yellow 53, C.I. direct yellow 58, C.I. direct yellow 59, C.I. direct yellow 68, C.I. direct yellow 86, C.I. direct yellow 87, C.I. direct yellow 93, C.I. direct yellow 95, C.I. direct yellow 96, C.I. direct yellow 98, C.I. direct yellow 100 C.I. direct yellow 106, C.I. direct yellow 108, C.I. direct yellow 109, C.I. direct yellow 110, C.I. direct yellow 130, C.I. direct yellow 132, C.I. direct yellow 142, C.I. direct yellow 144, C.I. direct yellow 161, and C.I. direct yellow 163. Among these dyes, C.I. direct yellow 86 and/or C.I. direct yellow 132 is preferably used. Specific other examples of the dye to be used in the yellow ink include C.I. acid yellow 17, C.I. acid yellow 19, C.I. acid yellow 23, C.I. acid yellow 25, C.I. acid yellow 39, C.I. acid yellow 40, C.I. acid yellow 42, C.I. acid yellow 44, C.I. acid yellow 49, C.I. acid yellow 50, C.I. acid yellow 61, C.I. acid yellow 64, C.I. acid yellow 76, C.I. acid yellow 79, C.I. acid yellow 110, C.I. acid yellow 127, C.I. acid yellow 135, C.I. acid yellow 143, C.I. acid yellow 151, C.I. acid yellow 159 C.I. acid yellow 169, C.I. acid yellow 174, C.I. acid yellow 190, C.I. acid yellow 195, C.I. acid yellow 196, C.I. acid yellow 197, C.I. acid yellow 199, C.I. acid yellow 218, C.I. acid yellow 219, C.I. acid yellow 222, C.I. acid yellow 227, C.I. reactive yellow 2, C.I. reactive yellow 3, C.I. reactive yellow 13, C.I. reactive yellow 14, C.I. reactive yellow 15, C.I. reactive yellow 17, C.I. reactive yellow 18, C.I. reactive yellow 23, C.I. reactive yellow 24, C.I. reactive yellow 25 C.I. reactive yellow 26, C.I. reactive yellow 27, C.I. reactive yellow 29, C.I. reactive yellow 35, C.I. reactive yellow 37, C.I. reactive yellow 41, C.I. reactive yellow 42, C.I. basic yellow 1, C.I. basic yellow 2, C.I. basic yellow 4, C.I. basic yellow 11, C.I. basic yellow 13, C.I. basic yellow 14, C.I. basic yellow 15, C.I. basic yellow 19, C.I. basic yellow 21, C.I. basic yellow 23, C.I. basic yellow 24, C.I. basic yellow 25, C.I. basic yellow 28, C.I. basic yellow 29, C.I. basic yellow 32, C.I. basic yellow 36, C.I. basic yellow 39, and C.I. basic yellow 40.

Examples of the dye to be used in the black ink include C.I. direct black 9, C.I. direct black 17, C.I. direct black 19, C.I. direct black 22, C.I. direct black 32, C.I. direct black 51, C.I. direct black 56, C.I. direct black 62, C.I. direct black 69, C.I. direct black 77, C.I. direct black 80, C.I. direct black 91, C.I. direct black 94, C.I. direct black 97, C.I. direct black 108, C.I. direct black 112, C.I. direct black 113 C.I. direct black 114, C.I. direct black 117, C.I. direct black 118, C.I. direct black 121, C.I. direct black 122, C.I. direct black 125, C.I. direct black 132, C.I. direct black 146, C.I. direct black 154, C.I. direct black 166, C.I. direct black 168, C.I. direct black 173, C.I. direct black 199, C.I. acid black 7, C.I. acid black 24, C.I. acid black 29, C.I. acid black 48, C.I. acid black 52:1, C.I. acid black 172, C.I. reactive black 4, C.I. reactive black 5, C.I. reactive black 8, C.I. reactive black 14, C.I. reactive black 21, C.I. reactive black 23, C.I. reactive black 26,reactive black 31, C.I. reactive black 32, C.I. reactive black 34, C.I. basic black 8, and C.I. food black 2.

[Preparation of Magenta Ink and Cyan Ink]

The preparation of magenta ink and cyan ink will be described hereinafter with reference to magenta ink. Cyan inks can be prepared similarly. Therefore, the description of cyan inks will be omitted.

The magenta ink comprises at least water in addition to the foregoing pigment and/or dye. Further, the magenta ink preferably comprises an organic solvent. The organic solvent to be used herein is preferably a low boiling organic solvent. Preferred examples of the low boiling organic solvent employable herein include methanol, ethanol, n-propyl alcohol, iso-propyl alcohol, n-butanol, sec-butanol, tert-butanol, iso-butanol, and pentanol. In particular, a monovalent alcohol is preferably used.

The magenta ink preferably comprises a wetting agent incorporated therein to inhibit the clogging of the nozzle of the recording head. Preferred examples of the wetting agent employable herein include diethylene glycol, polyethylene glycol, polypropylene glycol, ethylene glycol, propylene glycol, butylene glycol, triethylene glycol, 1,2,6-hexane triol, thioglycol, hexylene glycol, glycerin, trimethylolethane, trimethylolpropane, urea, 2-pyrrolidone, 1,3-dimethyl-2-imidazole, imidazole, and N-methyl-2-pyrrolidone. Saccharides may also be included. Examples of saccharides employable herein include monosaccharides, disaccharides, oligosaccharides (including trisaccharides, tetrasaccharides) and polysaccharides. Preferred examples of these saccharides include glucose, mannose, fructose, ribose, xylose, arabinose, galactose, aldonic acid, gluoitol (sorbitol), maltose, cellobiose, lactose, sucrose, trehalose, and maltriose. (The term "polysaccharides" as used herein is meant to indicate "materials which widely occur in the natural world, e.g., cellulose".)

The amount of the wetting agent to be added is not specifically limited. In practice, however, it is preferably from 0.5 to 40% by weight, more preferably from 2 to 20% by weight based on the weight of the ink.

The magenta ink also preferably comprises a penetrating agent such as alkylether derivative of polyhydric alcohol incorporated therein. Specific examples of the alkylether derivative of polyhydric alcohol employable herein include diethylene glycol mono-n-butyl ether, triethylene glycol mono-n-butyl ether, and propylene glycol mono-n-butyl ether. These compounds may be used singly or in admixture of two or more thereof. Preferred among these compounds are triethylene glycol mono-n-butyl ether and mixtures including triethylene glycol mono-n-butyl ether.

The amount of the alkylether derivative of polyhydric alcohol to be incorporated is preferably from 0.5 to 20% by weight, more preferably from 3 to 15% by weight based on the dispersion thus prepared.

Since as the colorant there is used a pigment, a "dispersant or surface active agent" for dispersing the pigment is preferably used.

As the foregoing dispersant there may be used any of those which have been already used commonly as dispersant for pigment dispersion. For example, polymer compounds and surface active agents can be used. More preferably, polymer compounds are used.

It is apparent to those skilled in the art that polymer compounds are preferably used as dispersants. It is generally thought that dispersion can be realized when a "repulsion force high enough to resist the attraction force" developed between pigment particles occurs. It is said that the "repulsion force" comprises one caused by surface potential given by electrical double layer formed on the surface of particles and one caused by steric hindrance due to an adsorption layer which has been absorbed by the surface of particles and extended from the surface of particles. When the repulsion force becomes greater (denser) and extends far from the surface of particles, a stable dispersion can be obtained. It is generally said that a dispersion having a greater stability can be obtained when a polymer compound having a molecular weight of from thousands to scores of thousands is used than when a surface active agent having a molecular weight of from scores to hundreds is used.

As the polymer dispersant there is preferably used a natural polymer compound. Specific examples of the natural polymer compound employable herein include proteins such as glue, gelatin, casein and albumin, natural rubbers such as gum arabic and tragacanth gum, glucosides such as saponin, alginic acid, alginic acid derivatives such as alginic acid propylene glycol ester, alginic acid triethanolamine, alginic acid ammonium and sodium alginate, and cellulose derivatives such as methyl cellulose, carboxymethyl cellulose, hydroxyethyl cellulose and ethylhydroxyethyl cellulose.

As the polymer dispersant there is also preferably used a synthetic polymer. Examples of the synthetic polymer employable herein include polyvinyl alcohols, polyvinyl pyrrolidones, acrylic resins such as polyacrylic acid, acrylic acid-acrylonitrile copolymer, potassium acrylate-acrylonitrile copolymer, vinyl acetate-acrylic acid ester copolymer and acrylic acid-acrylic acid alkylester copolymer, styrene-acryl resins such as styrene-acrylic acid copolymer, styrene-methacrylic acid-acrylic acid alkyl ester copolymer, styrene-α-methyl styrene-acrylic acid copolymer and styrene-αmethyl styrene-acrylic acid-acrylic acid alkyl ester copolymer, styrene-maleic acid copolymer, styrene-maleic anhydride copolymer, vinyl naphthalene-acrylic acid copolymer, vinyl acetate-ethylene copolymer, vinyl acetate-aliphatic acid vinyl ethylene copolymer and vinyl acetate-maleic acid ester copolymer, and salts thereof.

Particularly preferred among these synthetic polymers are a copolymer of monomer having hydrophobic group and monomer having hydrophilic group, and a polymer comprising a monomer having hydrophobic group and hydrophilic group in combination. Examples of the foregoing salts include salts of these compounds with diethylamine, ammonia ethylamine, triethylamine, propylamine, isopropylamine, dipropylamine, butylamine, isobutylamine, triethanolamine, diethanolamino, aminomethylpropanol morpholine, etc. These copolymers each preferably have a weight-average molecular weight of from about 3,000 to 30,000, more preferably from about 5,000 to 15,000.

The amount of such a dispersant to be incorporated is not specifically limited. In practice, however, the weight ratio of the dispersant to the pigment is preferably from 0.06 to 3, more preferably from 0.125 to 3.

Preferred examples of the surface active agent employable herein include anionic surface active agents (e.g., sodium dodecylbensenesulfonate, sodium laurate, ammonium salt of polyoxyethylene alkyl ether sulfate), and nonionic surface active agents (e.g, polyoxyethylene alkyl ether, polyoxyethylene alkyl ester, polyoxyethylenesorbitan fatty acid ester, polyoxyethylene alkyl phenyl ether, polyoxyethylene alkylamine, polyoxyethylene alkylamide). These surface active agents may be used singly or in combination of two or more thereof.

Further, an acetylene glycol represented by the following general formula (1) is preferably used. The use of the acetylene glycol assures that the surface tension of the ink and the wetting properties of the ink with respect to the recording medium can be properly adjusted and the ink can be provided on the recording medium with a proper penetrating power.

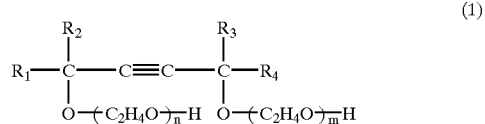

(1)

In the foregoing general formula (1), $R_1$, $R_2$, $R_3$ and $R_4$ each independently represents a $C_{1-6}$ alkyl group and is preferably a $C_{1-4}$ alkyl group, more preferably a methyl group. The suffixes n and m each are an integer such that the sum of n and m is from 0 to 30.

Preferred examples of the acetylene glycol compound represented by the foregoing general formula (1) include 2,4,7,9-tetramethyl-5-decine-4,7-diol, 3,6-dimethyl-4-octine-3,6-diol, and 3,5-dimethyl-1-hexine-3-ol. As the compound of the general formula (1) there may be also used a commercially available product. Examples of the commercially available products employable herein include Surfynol 104, Surfynol 82, Surfynol 465, Surfynol 485, and Surfynol TG (produced by Air Products and Chemicals, Inc.).

The amount of such an acetylene glycol compound to be incorporated is preferably from 0.01 to 10% by weight, more preferably from 0.1 to 5% by weight based on the weight of the dispersion thus prepared.

Further, the magenta ink may comprise a pH adjustor incorporated therein for the purpose of further improving the dispersion stability of the colorant. In this case the pH value of the magenta ink is preferably adjusted to a range of from 5 to 12, more preferably from 6 to 10.

Specific preferred examples of the pH adjustor employable herein include sodium, potassium or lithium salts such as sodium hydroxide, potassium hydroxide, lithium hydroxide, sodium carbonate, sodium hydrogencarbonate, potassium carbonate, lithium carbonate, sodium phosphate, potassium phosphate, lithium phosphate, potassium dihydrogenphosphate, dipotassium hydroxgenphosphate, sodium oxalate, potassium oxalate, lithium oxalate, sodium borate, sodium tetraborate, potassium hydrogenphthalate and potassium hydrogentartrate, ammonia, and amines such as methylamine, ethylamine, diethylamine, tris (hydroxymethyl) aminomethane hydrochloride, triethanolamine, morpholine and propanolamine.

The magenta ink may further comprise a viscosity adjustor, an antioxidant, an ultraviolet absorber, a preservative, a mildewproofing agent, etc. incorporated therein.

The preparation of the magenta ink comprising a pigment incorporated therein as a colorant is preferably accomplished by a process which comprises dispersing a pigment in water comprising the foregoing dispersant or surface active agent added thereto to prepare a pigment dispersion, and then mixing the pigment dispersion with water or an aqueous solution obtained optionally by adding the foregoing various additives to water. Alternatively, the pigment may be added to and dispersed in an aqueous solution obtained optionally by adding the foregoing various additives to water.

The preparation of the magenta ink comprising a dye incorporated therein as a colorant can be accomplished in the same manner as mentioned above if the dye used can be hardly dissolved or cannot be dissolved in water. Alternatively, the dye may be dissolved in an organic solvent instead of preparing a dye dispersion. If the dye used can be dissolved in water, the dye may be added to water or an aqueous solution obtained optionally by adding the foregoing various additives to water.

[Preparation of Light-Colored Magenta Ink and Light-Colored Cyan Ink]

The term "light-colored magenta ink or light-colored cyan ink" as used herein is meant to indicate an ink which exhibits a low reflection density and, if there are three or more light-colored magenta or cyan inks, it is meant to indicate inks other than the ink having the highest reflection density, when recorded on a recording medium among a plurality of light-colored magenta inks or light-colored cyan inks in an ink set.

The ink set and ink cartridge according to the foregoing first to third embodiments of implication of the invention comprise one or more of the same pigments as used in the foregoing magenta ink and cyan ink as a colorant.

The amount of the colorant to be incorporated in the light-colored magenta or cyan ink is such that the reflection density of the recording media on which the light-colored magenta or cyan ink is recorded is 50% or less of that of the recording medium on which the dark-colored magenta or cyan ink is recorded.

The light-colored magenta ink and light-colored cyan ink each may comprise as colorants dyes which can be used in the foregoing magenta ink and cyan ink in addition to the foregoing pigments. The weight ratio of pigment to dye is preferably from 100:0 to 1:99, more preferably from 100:0 to 10:90. As in the case of the foregoing preparation of magenta ink and cyan ink, it is preferred that the light-colored magenta ink and cyan ink comprise at least water in addition to pigments and comprise an organic solvent, the pigment is incorporated in the form of dispersion obtained by dispersing the pigment in an aqueous medium with a dispersant or surface active agent, and the light-colored magenta ink and cyan ink comprise a penetrating agent, a wetting agent and a pH adjustor incorporated therein.

[Preparation of Other Inks]

As in the case of the foregoing preparation of magenta ink and cyan ink, it is preferred that the other inks comprise at least water in addition to dyes, an organic solvent, a dispersant, a surface active agent, a penetrating agent, a wetting agent, a pH adjustor, a preservative, a mildewproofing agent, etc.

The amount of the dye to be incorporated in the light-colored ink among the other inks is preferably such that the reflection density of the recording medium on which the light-colored ink is recorded is 50% or less of that of the recording medium on which the dark-colored ink is recorded.

The "ink jet recording medium" to be used when the ink of the ink set and ink cartridge according to the foregoing second embodiment of implication of the present invention is ejected to effect recording will be further described hereinafter.

Today, various "ink jet recording media" on which a high quality image can been obtained have be developed. Among these ink jet recording media, the ink jet recording medium to be used in the second embodiment of implication of the present invention is an "ink jet recording medium having a porous ink-receiving layer (microporous/void-type ink-receiving layer) provided on a substrate" known as a recording medium having excellent quick-drying properties and water fastness which can provide a high quality image.

As the microporous ink-receiving layer there may be used any of conventional known microporous ink-receiving layers. In general, the microporous ink-receiving layer comprises an ink-absorbing pigment, an ink fixing agent and a binder as constituents, and optionally various additives such as dye fixing agent (water-proofing agent), fluorescent brightening agent, surface active agent, anti-foaming agent, pH adjustor, mildewproofing agent, ultraviolet absorber and antioxidant.

As the ink-absorbing pigments there may be used one or more known white pigments. Examples of these white pigments employable herein include white inorganic pigments such as light calcium carbonate, heavy calcium carbonate, magnesium carbonate, kaolin, talc, calcium sulfate, barium sulfate, titanium dioxide, zinc oxide, zinc sulfide, zinc carbonate, titanium white, aluminum silicate, diatomaceous earth, calcium silicate, magnesium silicate, synthetic amorphous silica, colloidal silica, alumina, colloidal alumina, pseudo boehmite, aluminum hydroxide, lithopone, zeolite, hydrous halloysite and magnesium hydroxide, and organic pigments such as styrenic plastic pigment, acrylic plastic pigment, polyethylene, melamine resin and urea resin.

As the ink fixing agent there is preferably used a cationic compound in particular. Examples of the cationic compound employable herein include low molecular weight compounds having primary to tertiary amines or quaternary ammonium salt group, and oligomers and polymers having these groups. Specific examples of these polymers include diallyl methyl ammonium salt polymers, diallyl amine hydrochloride-sulfur dioxide copolymers or diallyl methylamine hydrochloride copolymers such as diallyl dimethyl ammonium chloride polymer, diallyl dimethyl ammonium chloride-sulfur dioxide copolymer and diallyl dimethyl ammonium chloride-acrylamide copolymer, polyallylamine, polyethyleneimine, polyethyleneimine quaternary ammonium salt compound, (meth)acrylic acid alkyl ammonium salt polymer, (meth)acrylamide alkyl ammonium salt polymer, and ionene containing quaternary ammonium salt.

The amount of the ink fixing agent to be incorporated is preferably from 1% by weight to 30% by weight, more preferably from 5% by weight to 10% by weight based an the total dried weight of the ink-receiving layer.

Examples of the binder employable herein include aqueous adhesives such as starch derivative (e.g., starch oxide, etherified starch, phosphoric acid esterified starch), cellulose derivative (e.g, carboxymethyl cellulose, hydroxyethyl cellulose), casein, gelatin, soy bean protein, polyvinyl alcohol, derivative thereof, polyvinyl pyrrolidone, maleic anhydride resin, conjugated diene copolymer latex (e.g., styrene-butadiene copolymer, methyl methacrylate-butadiene copolymer), acrylic polymer latex comprising acrylic polymer (e.g., polymer or copolymer of acrylic acid ester and methacrylic acid ester), vinyl-based polymer latex (e.g., ethylene acetate-vinyl copolymer) functional group-modified polymer latex obtained by modifying these polymers with a functional group-containing monomer such as carboxyl group and thermosetting resin (e.g., melamine resin, urea resin), and synthetic resin-based adhesives such as acrylic acid ester (e.g., polymethyl methacrylate), polymer or copolymer of methacrylic acid ester, polyurethane resin, unsaturated polyester resin, vinyl chloride-vinyl acetate copolymer, polyvinyl butyral and alkyd resin. The amount of the binder to be incorporated in the ink is preferably from 10% by weight to 60% by weight, more preferably from 30% by weight to 50% by weight based on the total dried weight of the ink-receiving layer.

As the foregoing substrate there may be used paper or a plastic sheet. The substrate employable herein may or may not transmit light. Examples of paper employable herein include paper made of wood pulp mainly composed of natural cellulose fiber or non-wood pulp. Examples of the plastic material employable herein include polyester resin, diacetate resin, triacetate resin, acrylic resin, polycarbonate resin, polyvinyl chloride resin, polyimide resin, cellophane, and celluloid.

The ink jet recording method and recording apparatus according to the first to third embodiments of implication of the present invention will be further described in connection with FIGS. 1 to 5.

FIG. 1 is a schematic diagram illustrating the configuration of a printing system. The printing system comprises a recording apparatus 20 and a computer 90 as shown in FIG. 1. The recording apparatus 20 and the computer 90 are connected to each other through a connector 56.

The recording apparatus 20 comprises a subsidiary scanning feed mechanism, a main scanning feed mechanism, and a head drive mechanism. The subsidiary scanning feed mechanism comprises a paper feed motor 23 and a platen 26. By transmitting the rotation of the paper food motor 23 to the platen 26, the ink jet recording medium P is carried in the direction of subsidiary scanning. The main scanning feed mechanism comprises a carriage motor 32, a pulley 38, a drive belt 36 provided extending between the carriage motor 32 and the pulley 38, and at sliding axis 34 provided parallel to the axis of the platen 26. The sliding axis 34 holds the carriage 31 fixed to the drive belt 36 slidably. The rotation of the carriage motor 32 is transmitted to be carriage 31 via the drive belt 36 so that the carriage 31 moves back and forth in the direction of the axis of the platen 26 (direction of main scanning) along the sliding axis 34. The head drive mechanism drives a printing head unit 60 mounted on the carriage 31 to eject the ink onto the ink jet recording medium P. The paper feed motor 23, the carriage motor 32 and the printing head unit 60 are connected to a control circuit 40 so that the operation of the various mechanisms are controlled by the control circuit 40.

The recording apparatus 20 comprises an operation panel 80. The operation panel 80 is connected to the control circuit 40. In this arrangement, the user can not only make various setting of the recording apparatus 20 by depressing the buttons provided on the operation panel 80 but also confirm how the recording apparatus 20 operates by monitoring display lamps (not shown) provided on the operation panel 80. (In FIG. 1, the reference numeral 28 indicates a printing head, the reference numerals 61 to 66 each indicate a nozzle array, the reference numeral 71 indicates a black ink cartridge, and the reference numeral 72 indicates a color ink cartridge. These components will be further described later.)

FIG. 2 is a block diagram illustrating the internal configuration of the control circuit 40 of FIG. 1. The control circuit 40 comprises CPU 41, P-ROM (programmable ROM) 43, RAM 44, CG (character generator) 45 keeping dot matrixes such as character in memory, I/F dedicated circuit 50, a head drive circuit 52, a motor drive circuit 54. I/F dedicated circuit 50 comprises a serial interface circuit and a parallel interface circuit (not shown) incorporated therein and receives a printing signal PS supplied from the computer 90 through the connector 56. The head drive circuit 52 is a circuit for driving the printing head unit 60. The motor drive circuit 54 is a circuit for driving the paper feed motor 23 and the carriage motor 32. (In FIG. 2, the reference numeral 28 indicates a printing head, and the reference numeral 80 indicates an operation panel.)

FIG. 3 is a perspective view of the printing head unit 60. The printing head unit 60 can be loaded with the black ink cartridge 71 and color ink cartridge 72 shown in FIG. 1. As shown in FIG. 1, the printing head 28 provided at the lower portion of the printing head unit 60 comprises a total of 6 sets of nozzle arrays 61 to 66 forward therein corresponding to the black ink and color inks.

Provided vertically at the bottom of the printing head unit 60 are inlet pipes 73 to 78 for introducing inks from the ink tanks into these nozzle arrays as shown in FIG. 3. The inlet pipe 73 is a pipe for introducing the ink from the black ink cartridge. The inlet pipers 74 to 78 are pipes for introducing inks from the color ink cartridge.

FIG. 4 is a perspective view of the color ink cartridge 72 according to the foregoing first to third embodiments of implication of the present invention. The color ink cartridge 72 comprises an ink set having five inks, i.e., dark-colored cyan (C), light-colored cyan (LC), dark-colored magenta (M), light-colored magenta (LM) and yellow (Y) integrally received therein. The light-colored cyan ink is an ink having almost the same hue as the dark-colored cyan ink but a lower density than the dark-colored cyan ink. This applies also to the light-colored magenta ink. The light-colored cyan ink and the light-colored magenta ink are received in a greater amount than the dark-colored cyan ink and the dark-colored magenta ink, respectively. The yellow ink is received in the greatest amount among the five inks.

FIG. 5 is a diagram illustrating the 6 sets of nozzle arrays 61 to 66 provided at the bottom of the printing head 28. The nozzle arrays 61 to 66 each comprise 48 nozzles Nz which are arranged in a line at a constant pitch k. The nozzle arrays 61 to 66 are each provided with a piezoelectric element (drive element) corresponding to the nozzles Nz (not shown). This piezoelectric element is an element utilizing a dynamic strain developed when a voltage is applied across a crystal as well known. The piezoelectric element is provided in the vicinity of the nozzle Nz in contact with the foregoing ink passage. By applying a predetermined voltage to the piezoelectric element, the width of the ink passage can be increased or decreased. As a result, ink droplets are ejected from the nozzle Nz. The nozzle arrays 61 to 66 are provided with a plurality of nozzles Nz having the same shape. However, by changing the magnitude of the voltage applied to the piezoelectric element or the sweeping method, the amount of ink droplets to be ejected from the nozzles Nz can be changed.

Among the nozzle array 61 to 66, the nozzle array 61 ejects a black ink (K) supplied from the black ink cartridge 71. The nozzle arrays 62 to 66 eject a dark-colored cyan (C), a light-colored cyan ink (LC), a dark-colored magenta ink (M), a light-colored magenta ink (LM), and a yellow ink (Y) supplied from the color ink cartridge 72, respectively.

Example 3 described later is an example of the arrangement of the foregoing nozzle arrays 61 to 66. The four inks, i.e., black ink (K), dark-colored cyan ink (C), dark-colored magenta ink (M) and yellow ink (Y) are dye inks comprising a dye incorporated therein as a colorant. The two inks, i.e., light-colored cyan ink (LC) and light-colored magenta ink (LM) are pigment inks comprising a pigment incorporated therein as a colorant.

EXAMPLES

The present invention will be further described in the following examples and comparative examples, but the present invention should not be construed as being limited thereto.

Examples 1-1 to 1-6 and Comparative Example 1 are according to the first embodiment of implication of the present invention. Examples 2-1 to 2-7 and Comparative Example 2-1 and 2-2 are according to the second embodiment of implication of the present invention. Example 3 and Comparative Example 3 are according to the third embodiment of implication of the present invention.

Example 1-1

An ink jet recording color ink set comprising a light-colored magenta ink having the following formulation and other five inks comprising the following dark-colored magenta ink, yellow ink, dark-colored cyan ink and light-colored cyan ink.

| [Light-colored magenta ink] | |
|---|---|
| C.I. pigment red 122 | 1.5% by weight |
| Styrene-acrylic acid copolymer (dispersant) (molecular weight: 7,000) | 4% by weight |
| Diethylene glycol | 5% by weight |
| Glycerin | 10% by weight |
| Triethylene glycol mono-n-butylether | 8% by weight |
| Surfynol 465 | 1% by weight |
| Potassium hydroxide | 0.2% by weight |
| Purified water | Balance |

All the foregoing components were charged in Minimill 100 (produced by Eiger Machinery Inc., Benzenbille Ill.) where they were then milled at 3,000 rpm for 2 hours. The dispersion thus obtained was then filtered through a membrane filter having a pore diameter of 5 $\mu$m to obtain an ink composition containing a pigment in an amount of 1.5% by weight.

[Various Inks]

Various inks were prepared in the same manner as in the foregoing light-colored magenta ink except teat the following colorants were used, respectively, instead of the foregoing colorant. No dispersants were added to the various inks.

| *Dark-colored magenta ink: C.I. direct red 227 | 4% by weight |
|---|---|
| *Yellow ink: C.I. direct yellow 86 | 3.5% by weight |
| *Dark-colored cyan ink: C.I. direct blue 199 | 3.5% by weight |
| *Light-colored cyan ink: C.I. direct blue 199 | 1% by weight |

Example 1-2

An ink jet recording color ink set comprising the same light-colored magenta ink as used in Example 1-1 and other five inks comprising the following dark-colored magenta ink, yellow ink, dark-colored cyan ink and light-colored cyan ink.

[Various Inks]

Various inks were prepared in the same manner as in Example 1-1 except that the following colorants were used, respectively, instead of the foregoing colorant for the light-colored magenta ink. No dispersants were added to the various inks but the dark-colored magenta ink.

| *Dark-colored magenta ink: C.I. pigment red 122 | 4% by weight |
|---|---|
| *Yellow ink: C.I. direct yellow 132 | 3.5% by weight |
| *Dark-colored cyan ink: C.I. direct blue 199 | 3.5% by weight |
| *Light-colored cyan ink: C.I. direct blue 199 | 1% by weight |

Example 1-3

An ink jet recording color ink set comprising the same light-colored magenta ink as used in Example 1-1 and other five inks comprising the following dark-colored magenta ink, yellow ink, dark-colored cyan ink, and light-colored cyan ink

[Various Inks]

Various inks were prepared in the same manner as in Example 1-1 except that the following colorants were used, respectively, instead of the colorant for the light-colored magenta ink. No dispersants were added to the various inks.

| *Dark-colored magenta ink: C.I. direct red 227 | 4% by weight |
|---|---|
| *Yellow ink: | |
| C.I. direct yellow 132 | 2% by weight |
| C.I. direct yellow 86 | 2% by weight |
| *Dark-colored cyan ink: C.I. direct blue 199 | 3.5% by weight |
| *Light-colored cyan ink: C.I. direct blue 199 | 1% by weight |

Example 1-4

| *Dark-colored magenta ink: | |
|---|---|
| C.I. pigment red 122 | 3.2% by weight |
| C.I. direct red 227 | 0.8% by weight |

A dark-colored magenta ink was prepared in the same manner an in Example 1-1 except that the foregoing formulation (pigment:dye=8:2) was used. The other inks were prepared in the same manner as in Example 1-1. Thus, an ink jet recording color ink set was prepared.

Example 1-5

| *Dark-colored magenta ink: | |
|---|---|
| C.I. pigment red 122 | 2% by weight |
| C.I. direct red 227 | 2% by weight |

A dark-colored magenta ink was prepared in the same manner as in Example 1-1 except that the foregoing formulation (pigment:dye=5:5) was used. The other inks were prepared in the same manner as in Example 1-1. Thus, an ink jet recording color ink set was prepared.

Example 1-6

| *Dark-colored magenta ink: | |
|---|---|
| C.I. pigment red 122 | 0.8% by weight |
| C.I. direct red 227 | 3.2% by weight |

A dark-colored magenta ink was prepared in the same manner as in Example 1-1 except that the foregoing formulation (pigment:dye=2:8) was used. The other inks were prepared in the same manner as in Example 1-1. Thus, an ink jet recording color ink set was prepared.

Comparative Example 1

An ink jet recording color ink set having the same formulation as in Example 1-1 except that the colorant for the light-colored magenta ink is C.I. direct red 227 (1% by weight). No dispersants were added to the light-colored magenta ink.

Examples 1-1 to 1-6 and Comparative Example 1 were evaluated by the following test methods. The results are set forth in Table 2 below.

Test Methods (1-1) Image Quality Test

The inks in the color ink cartridge (PMICIC) of a Type PM700C ink jet printer (produced by SEIKO EPSON CORPORATION) were replaced by the inks prepared in Examples 1-1 to 1-6 and Comparative Example 1. As a black ink cartridge there was used MJIC7, which is a genuine product. Using this printer with these inks, an image name "Portrait" (Sample No. 1, image identification symbol N1) of high precision color digital standard image data (ISO/JIS-SCID) was printed on PPC paper and ink jet glossy paper [Superfine dedicated (photo quality) glossy paper (MJA4SP3) produced by SEIKO EPSON CORPORATION]. The image thus formed was then visually observed for sharpness.

Visually evaluated sharpness of image

Sharply reproduced image: A

Obscure image: B (1-2) Light Fastness Test-1

The image obtained by the foregoing image quality test (1-1) was subjected to acceleration test at 36 kJ/m² using a xenon fadeometer (CI35A). Further, a blue image was printed. The blue image thus printed was then subjected to the same acceleration test.

The color difference $\Delta E$ in the background (gray) of the portrait image and the blue color between before and after test was measured by the method defined in JIS-Z 8730.

Criterion

Color difference of less a 5: A

Color difference of from 5 to 10: B

Color difference of greater than 10: C (1-3) Light Fastness Test-2

The inks in the color ink cartridge (PMICIC) of a Type PM700C ink jet printer (produced by SEIKO EPSON CORPORATION) were replaced by the inks prepared in Examples 1-1 to 1-6 and Comparative Example 1. As a black ink cartridge there was used MJIC7, which is a genuine product. Using this printer with these inks, color images were printed with yellow, magenta and cyan inks on PPC paper and ink jet glossy paper [Superfine dedicated (photo quality) glossy paper (MJA4SP3) produced by SEIKO EPSON CORPORATION] such that the image density (OD value) was about 1.0. Using a Type Gretag SPM100-II spectrophotometer (produced by Gretag Imaging AG.), the color prints were then measured for OD value before and after testing in the same manner as in (1-2) light fastness test-1 to determine the percent density drop thereof.

Criterion

Percent remaining of density is 90% or more: A

Percent remaining of density is from 80% to less than 90%: B

Percent remaining of density in less than 80%: C

TABLE 2

| Example No. | Image quality | Light fastness 1 | | Light fastness 2 | | |
|---|---|---|---|---|---|---|
| | | Gray | Blue | Y | M | C |
| Example 1-1 | A | A | A | A | A | A |
| Example 1-2 | A | A | A | A | A | A |
| Example 1-3 | A | A | A | A | A | A |
| Example 1-4 | A | A | A | A | A | A |
| Example 1-5 | A | A | A | A | B | A |
| Example 1-6 | A | A | A | A | B | A |
| Comparative Example 1-1 | A | C | B | A | C | A |

As can be seen in the test results shown in Table 2, Examples 1-1 to 1-6 according to the first embodiment of implication of the present invention (examples of the use of pigment as light-colored magenta ink) were evaluated as "A" or "B" for "light fastness 1" and "light fastness 2".

On the contrary, Comparative Example 1 (example of the use of dye as light-colored magenta ink) was evaluated as "C" particularly for "light fastness 1 (gray)" and "light fastness 2 (M)".

Example 2-1

A light-colored cyan ink, a dark-colored cyan ink, a light-colored magenta ink, a dark-colored magenta ink and a yellow ink were prepared according to the following formulation. The inks in a color ink cartridge IC5CL05 (produced by SEIKO EPSON CORPORATION) were then replaced by these inks to prepare an ink cartridge of Example 2-1 comprising five color inks in total.

| [Light-colored cyan ink] | |
|---|---|
| C.I. pigment blue 15:3 | 1.5% by weight |
| Styrene-acrylic acid copolymer (dispersant) (molecular weight: 7,000) | 4% by weight |

-continued

[Light-colored cyan ink]

| | |
|---|---|
| Diethylene glycol | 5% by weight |
| Glycerin | 10% by weight |
| Triethylene glycol mono-n-butyl ether | 9% by weight |
| Surfynol 465 | 1% by weight |
| Potassium hydroxide | 0.2% by weight |
| Purified water | Balance |

All the foregoing components were charged in Minimill 100 (produced by Eiger Machinery Inc., Benzenbille Ill.) where they were then milled at 3,000 rpm for 2 hours. The dispersion thus obtained was then filtered through a membrane filter having a pore diameter of 5 μm to obtain an ink composition containing a pigment in an amount of 1.5% by weight.

[Other Inks]

The following colorants were used instead of the colorant for the foregoing light-colored cyan ink. No dispersants were added to the light-colored magenta ink, the dark-colored magenta ink and the yellow ink. All the other components were stirred to obtain an ink composition. (The foregoing milling and filtration were not affected.)

| | |
|---|---|
| *Dark-colored cyan ink: C.I. pigment blue 15:3 | 6.0% by weight |
| *Light-colored magenta ink: C.I. direct red 227 | 1.5% by weight |
| *Dark-colored magenta ink: C.I. direct red 227 | 6.0% by weight |
| *Yellow ink: C.I. direct yellow 86 | 6.0% by weight |

Example 2-2

| | |
|---|---|
| *Light-colored cyan ink: | |
| C.I. pigment blue 15:3 | 1.2% by weight |
| C.I. direct blue 199 | 0.3% by weight |
| *Dark-colored cyan ink: | |
| C.I. pigment blue 15:3 | 4.8% by weight |
| C.I. direct blue 199 | 1.2% by weight |

A light-colored cyan ink and a dark-colored cyan ink ere prepared in the same manner as in Example 2-1 except that the foregoing formulation (pigment:dye=8:2) was used. The other inks were prepared in the same manner as in Example 2-1. Thus, an ink cartridge of Example 2-2 was prepared.

Example 2-3

| | |
|---|---|
| *Light-colored cyan ink: | |
| C.I. pigment blue 15:3 | 0.8% by weight |
| C.I. direct blue 199 | 0.8% by weight |
| *Dark-colored cyan ink: | |
| C.I. pigment blue 15:3 | 3.0% by weight |
| C.I. direct blue 199 | 3.0% by weight |

A light-colored cyan ink and a dark-colored cyan ink were prepared in the same manner as in Example 2-1 except that the foregoing formulation (pigment:dye=5:5) was used. The other inks were prepared in the same manner as in Example 2-1. Thus, an ink cartridge of Example 2-3 was prepared.

Example 2-4

| | |
|---|---|
| *Light-colored cyan ink: | |
| C.I. pigment blue 15:3 | 0.3% by weight |
| C.I direct blue 199 | 1.2% by weight |
| *Dark-colored cyan ink: | |
| C.I. pigment blue 15:3 | 1.2% by weight |
| C.I. direct blue 199 | 4.8% by weight |

A light-colored cyan ink and a dark-colored cyan ink were prepared in the same manner as in Example 2-1 except that the foregoing formulation (pigment:dye=2:8) was used. The other inks were prepared in the same manner as in Example 2-1. Thus, an ink cartridge of Example 2-4 was prepared.

Example 2-5

The procedure of Example 2-2 was followed except that C.I. direct blue 199 to be incorporated in the light-colored cyan ink and dark-colored cyan ink was replaced by C.I. acid blue 9. Thus, an ink cartridge of Example 2-5 was prepared.

Example 2-6

The procedure of Example 2-3 was followed except that C.I. direct blue 199 to be incorporated in the light-colored cyan ink and dark-colored cyan ink was replaced by C.I. acid blue 9. Thus, an ink cartridge of Example 2-6 was prepared.

Example 2-7

The procedure of Example 2-4 was followed except that C.I. direct blue 199 to be incorporated in the light-colored cyan ink and dark-colored cyan ink was replaced by C.I. acid blue 9. Thus, an ink cartridge of Example 2-7 was prepared.

Comparative Example 2-1

| | |
|---|---|
| *Light-colored cyan ink: C.I. direct blue 199 | 1.5% by weight |
| *Dark-colored cyan ink: C.I. direct blue 199 | 6.0% by weight |

A light-colored cyan ink and a dark-colored cyan ink were prepared according to the same formulation of light-colored cyan ink as used in Example 2-1 except that the foregoing formulation was used. The other inks were prepared in the same manner as in Example 2-1. Thus, an ink cartridge of Comparative Example 2-1 was prepared.

Comparative Example 2-2

| | |
|---|---|
| *Light-colored cyan ink: C.I. acid blue 9 | 1.5% by weight |
| *Dark-colored cyan ink: C.I. acid blue 9 | 6.0% by weight |

A light-colored cyan ink and a dark-colored cyan ink were prepared according to the same formulation of light-colored cyan ink as used in Example 2-1 except that the foregoing formulation was used. The other inks were prepared in the same manner as in Example 2-1. Thus, an ink cartridge of Comparative Example 2-2 was prepared.

Examples 2-1 to 2-7 and Comparative Examples 2-1 and 2-2 were then evaluated according to the following rest methods. The results are set forth in Table 3 below.

Test Methods (2-1) Image Quality Test

Using a Type PM-800C ink jet printer (produced by SEIKO EPSON CORPORATION) with the ink cartridges prepared in Examples 2-1 to 2-7 and Comparative Examples 2-1 and 2-2 and a Type IC1BK05 black ink cartridge (produced by SEIKO EPSON CORPORATION), an image name "Portrait" (Sample No. 1, image identification symbol N1) of a high precision color digital standard image data (ISO/JIS-SCID) was printed on a PM photographic paper having a microporous/void type ink-receiving layer (produced by SEIKO EPSON CORPORATION). The image thus printed was then visually observed for sharpness.

Visually evaluated sharpness of image

Sharply reproduced image: A

Image is reproduced, but dull: B

Obscure image: C (2-2) Water Fastness Test

A water droplet was dropped from a dropping pipette onto the printed matter obtained in the foregoing image quality test (2-1). The image was then visually observed for bleeding.

Visual evaluation of bleeding on image

No bleeding observed: A

Little bleeding observed: B

Bleeding observed: C (2-3) Gas Resistance Test

The printed matter obtained in the foregoing image quality test (2-1) was allowed to stand in an atmosphere of a mixture of 1 ppm of ozone, 1 ppm of nitrogen dioxide ($NO_2$) and 1 ppm of sulfur dioxide ($SO_2$) for 24 hours for acceleration test. The color difference $\Delta E$ in the background (gray) of the portrait image and the cyan color between before after test was measured according to the test method defined in JIS-Z8730.

Criterion

Color difference of less 5: A

Color difference of from 5 to 10: B

Color difference of greater than 10: C (2-4) Light Fastness Test

The printed matter obtained in the foregoing image quality test (2-1) was subjected to acceleration test using a xenon fadeometer (C135A) for 100 hours.

The color difference $\Delta E$ in the background (gray) of the portrait image and the cyan color between before and after test was measured according to the test method defined in JIS-Z8730.

Criterion

Color difference of less than 5: A

Color difference of from 5 to 10: B

Color difference of greater than 10: C

TABLE 3

| Example No. | Colorant for cyan ink | Image quality | Water fastness | Gas resistance | Light fastness |
|---|---|---|---|---|---|
| Example 2-1 | 100% pig15:3 | B | A | A | A |
| Example 2-2 | pig15:3/dye199 = 80/20 | A | A | A | A |
| Example 2-3 | pig15:3/dye190 = 30/50 | A | A | A | A |
| Example 2-4 | pig15:3/dye199 = 20/80 | A | A | B | A |
| Example 2-5 | pig15:3/dye9 = 80/20 | A | B | A | B |
| Example 2-6 | pig15:3/dye9 = 50/50 | A | B | A | B |
| Example 2-7 | pig15:3/dye9 = 20/80 | A | B | A | B |
| Comparative Example 2-1 | 100% dye199 | A | B | C | B |
| Comparative Example 2-2 | 100% dye9 | A | C | B | C | pig15:3: C.I. pigment blue 15:3
dye199: C.I. direct blue 199
dye9: C.I. acid blue 9

As can be seen in the test results shown in Table 3 above, the recorded materials obtained using the ink cartridges of Examples 2-1 to 2-7 (according to the second embodiment of implication of the present invention,) comprising a light-colored cyan ink and a dark-colored cyan ink containing a dye as a colorant exhibited a high image quality, a high water fastness, a high gas resistance and a high light fastness. In particular, the ink cartridges of Examples 2-2, 2-3, 2-5, 2-6 and 2-7 provided a recorded material having an extremely high image quality and gas resistance.

On the contrary, the recorded materials obtained using the ink cartridges of Comparative Examples 2-1 and 2-2 comprising a light-colored cyan ink free of pigment as a colorant didn't exhibit a high water fastness, a high gas resistance and a high light fastness. In other words, the recorded materials obtained using the ink cartridge of Comparative Example 2-1 comprising a light-colored cyan ink and a dark-colored cyan ink containing C.I. direct blue 199 (dye) alone as a colorant exhibited a low water fastness and a low light fastness. The recorded material obtained using the ink cartridge of Comparative Example 2-2 comprising a light-colored cyan ink and a dark-colored cyan ink containing C.I. acid blue 9 (dye) alone as a colorant exhibited a low gas resistance.

Example 3

An ink jet recording color ink set comprising a dark-colored cyan ink (C), a light-colored cyan ink (LC), a dark-colored magenta ink (M), a light-colored magenta ink (LM), a yellow ink (Y) and a black ink (K).

[Dark-colored cyan ink (C)]

| | |
|---|---|
| C.I. direct blue 199 | 3.6% by weight |
| Diethylene glycol | 30% by weight |
| Surfynol 465 (penetrating agent) | 1% by weight |
| Water | 65.4% by weight |

-continued

| [Light-colored cyan ink (LC)] | |
|---|---|
| C.I. pigment blue 15:13 | 1% by weight |
| Surfynol 465 | 1% by weight |
| Ammonium salt of styrene-acrylic acid copolymer (dispersant) | 1.5% by weight |
| Glycerin | 13% by weight |
| Triethylene glycol monobutyl ether | 7% by weight |
| Proxal XL2 [preservative] | 0.3% by weight |
| Water | 76.2% by weight |

[Other Inks]

The formulation of the dark-colored magenta ink (M), light-colored magenta ink (LM), yellow ink (Y) and black ink (K) are set forth in Table 4 below with that of the foregoing dark-colored cyan ink (C) and light-colored cyan ink (LC).

TABLE 4

| | | C Dye | LC Pigment | M Dye | LM Pigment | Y Dye | K Dye |
|---|---|---|---|---|---|---|---|
| Colorant | C.I. direct blue 199 | 3.6 | | | | | |
| | C.I. acid red 289 | | | 2.8 | | | |
| | C.I. direct yellow 86 | | | | | 1.8 | |
| | C.I. food black 2 | | | | | | 4.8 |
| | C.I. pigment red 122 | | | | 1 | | |
| | C.I. pigment blue 15:3 | | 1 | | | | |
| Diethylene glycol | | 30 | | 20 | | 30 | 25 |
| Surfynol 465 | | 1 | 1 | 1 | 1 | 1 | 1 |
| Water | | 65.4 | 76.2 | 76.2 | 76.2 | 67.2 | 69.2 |
| Ammonium salt of styrene-acryl copolymer | | | 1.5 | | 1.5 | | |
| Glycerin | | | 13 | | 13 | | |
| Triethylene glycol monobutyl ether | | | 7 | | 7 | | |
| Proxel XL2 | | | 0.3 | | 0.3 | | |

(Unit: % by weight)

The effect of Example 3 (example of the third embodiment of implication of the present invention) will be described hereinafter.

In a low image density range, a light-colored cyan ink is mainly used as a cyan ink. On the other hand, in a high image density range, a dark-colored cyan ink is mainly used as a cyan ink (This can apply also to magenta ink). The proper use of inks provides the following advantages.

In some detail, in Example 3, as a light-colored ink (light-colored cyan or magenta ink) there is used a "pigment ink". Thus, in a low image density range, printing is effected with a pigment ink. A small amount of ink is used in a low image density range. Thus, a low image density area often leaves something to be desired in light fastness. However, since a pigment ink has an excellent light fastness, Example 3 provides an improvement of light fastness of highlight area.

Further, a pigment ink undergoes less bleeding on printing paper than a dye ink. Thus, a pigment ink provides a dot having a smaller diameter than that provided by a dye ink when used in the same amount. Accordingly, when as a light-colored cyan ink there is used a pigment ink, the dot thus printed has a smaller diameter than printed with a dye ink. As a result, the graininess in a low image density range can be reduced to advantage.

Further, since a "dye ink" is used as a dark-colored ink (dark-colored cyan or magenta ink) in Example 3, a wider range of color reproduction can be realized to advantage as described hereinafter in connection with FIG. 6.

FIG. 6 is a diagram illustrating the difference in color reproduction between the use of a dye and a pigment as a colorant for dark-colored ink. This diagram is based on the supposition that a uniform range of red color is reproduced. The abscissa indicates color saturation $C^*$, and the ordinate indicates lightness $L^*$. The solid line indicates the characteristics of Example 3 using a dye as a colorant for dark-colored ink and the broken line indicates the characteristics of Comparative Example 3 using a pigment as a colorant for dark-colored ink. FIG. 6 indicates the characteristic of printed matters using inks comprising a dark-colored ink alone and free of light-colored ink.

The red color is reproduced with a yellow ink and a magenta ink. The red color having a high lightness $L^*$ and a low color saturation $C^*$ (color in the vicinity of top left end of the graph of FIG. 6) is almost close to white (W). On the other hand, the red color having a low lightness $L^*$ and a high color saturation $C^*$ (color in the vicinity of lower right and of the graph of FIG. 6) is almost close to pure red (R).

As can be seen in the graph of FIG. 6, Example 3 can accomplish a high color saturation for the same lightness as compared with Comparative Example 3. On the contrary, Comparative Example 3 cannot accomplish a lightness greater than the characteristics shown by the broken line. Accordingly, Example 3 provides a better color developability than Comparative Example 3 and thus can secure a wide range of color reproduction.

Thus, in Example 3, as a dark-colored ink (dark-colored cyan or magenta ink) there is used a "dye ink". Accordingly, a better color developability can be provided than the case where a "pigment ink" is used as a dark-colored ink. As a result, a wider range of color reproduction can be realized.

[Modification of Example 3]

Example 3 according to the third embodiment of implication of the present invention can be modified as follows. These modifications are included in the invention.

Modification 1

While Example 3 involves the use of a dark-colored ink and a light-colored ink as to cyan and magenta, a dark-colored ink and a light-colored ink may be used for other hues. For example, a dark-colored ink and a light-colored ink may be used as yellow inks.

Further, as inks having the same hue there may be used three or more inks having different densities. In other words, the present invention can be applied to the case where a plurality of inks having the same hue but different densities for at least one hue (referred to as "ink having the same hue") are used. In this case, when the ink having the highest density among the plurality of inks having the same hue comprises a "dye" as a colorant (coloring material) and the ink having the lowest density comprises a "pigment" as a colorant (coloring material), either a dye or a pigment may be used as a coloring material for middle density ink. In this arrangement, the light fastness in a low image density range can be improved. At the same time, a wide range of color reproduction can be secured. In order to secure a wide range of color reproduction, as an ink having the hue comprising an ink of one density alone there is preferably used a "dye", as a colorant.

Modification 2

While Example 3 involves the use of four hues, i.e., black, cyan, magenta and yellow as ink hues, inks of other hues may be used. For example, red or green ink may be used.

Modification 3

While Example 3 is based on the supposition that color inks (chromatic color inks) other than black ink are integrally received in one ink cartridge 72 (see FIG. 4), the cartridge for color inks (ink vessel) may be divided into a plurality of portions.

Further, while Example 3 is based on the supposition that the ink cartridge and the printing head are separately arranged, the ink cartridge and the printing head may be integrally arranged.

As mentioned in detail above, the present invention is an "ink set comprising a dye ink and a pigment ink in combination, characterized in that there are contained a plurality of inks having the same hue but different densities for at least one hue and at least one of the inks having a low density comprises a pigment incorporated therein as a colorant".

Thus, the use of an "ink having a low density (light-colored ink)" comprising a pigment incorporated therein as a colorant makes it possible to provide an "ink set, ink cartridge and recording method" which allow printing of an image having an excellent color reproduction and a good discoloration resistance and color developability and particularly provide improvements in properties such as light fastness water fastness in a low image density range (highlight range), and a "recorded material thus obtained and recording apparatus therefor".

While the invention has described in detail and with reference to specific embodiments thereof, it will be apparent to one skilled in the art that various changes and modifications can be made therein without departing from the spirit and scope thereof.

What is claimed is:

1. An ink set comprising a dye ink and a pigment ink in combination, wherein the ink set comprises a plurality of inks having the same hue but different densities for at least one hue, said at least one hue being selected from the group consisting of a cyan hue and a magenta hue whereby said plurality of inks comprises at least a plurality of cyan inks or a plurality of magenta inks wherein at least one of the plurality of cyan or magenta inks has a low density and another of the plurality of cyan or magenta inks has a high density, wherein the at least one of the cyan or magenta inks having a low density comprises a pigment as a colorant.

2. The ink set according to claim 1, wherein said plurality of inks having the same hue but different densities are magenta ink, at least a light-colored magenta ink among said plurality of magenta inks comprises a pigment incorporated therein as a colorant and the other inks having hue different from the magenta inks each comprise a dye incorporated therein as a colorant.

3. The ink set according to claim 2, wherein said light-colored magenta ink comprises C.I. pigment red 122 incorporated therein as a colorant.

4. The ink set according to claim 2, wherein said light-colored magenta ink comprises C.I. pigment red 122 incorporated therein as a colorant, the colorants for yellow ink are C.I. direct yellow 132 and/or C.I. direct yellow 86, and the colorant for cyan ink is C.I. direct blue 199.

5. The ink set according to claim 4, wherein said cyan ink comprises a dark-colored cyan ink and a light-colored cyan ink.

6. The ink set according to claim 1, wherein said plurality of inks having the same hue but different densities are magenta inks, and said magenta ink comprises a dark-colored magenta ink and a light-colored magenta ink and said two magenta inks each comprise a pigment incorporated therein as a colorant.

7. The ink set according to claim 1, wherein said plurality of inks having the same hue but different densities are cyan inks, at least a light-colored cyan ink among said plurality of cyan inks comprises a pigment incorporated therein as a colorant and the other inks having hue different from the cyan inks each comprise a dye incorporated therein as a colorant.

8. The ink set according to claim 7, wherein said cyan ink comprises C.I. pigment blue 15:3 incorporated therein as a colorant.

9. The ink set according to claim 7, wherein said light-colored cyan ink comprises a pigment and a dye incorporated therein as colorants.

10. The ink set according to claim 7, which is an ink set for recording on an ink jet recording medium having a porous ink-receiving layer provided on a substrate.

11. The ink set according to claim 1, wherein said plurality of inks having the same hue but different densities are a magenta ink and a cyan ink, at least a light-colored magenta ink and a light-colored cyan ink among said plurality of magenta inks and cyan inks each comprise a pigment incorporated therein as a colorant and the other inks each comprise a dye incorporated therein as a colorant.

12. A recording apparatus arranged such that an ink set according to claim 1, can be mounted thereon and said plurality of inks constituting said ink set can be ejected.

13. An ink cartridge comprising a plurality of magenta inks having different densities and other inks received therein integrally or independently at least partly, wherein at least a light-colored magenta ink among said plurality of magenta inks comprises a pigment incorporated therein as a colorant and the other inks having hue different from the magenta inks each comprise a dye incorporated therein as a colorant.

14. The ink cartridge according to claim 13, wherein said light-colored magenta ink comprises C.I. pigment red 122 incorporated therein as a colorant.

15. The ink cartridge according to claim 13, wherein said light-colored magenta ink comprises C.I. pigment red 122 incorporated therein as a colorant, the colorants for yellow ink are C.I. direct yellow 132 and/or C.I. direct yellow 86, and the colorant for cyan ink is C.I. direct blue 199.

16. The ink cartridge according to claim 15, wherein said cyan ink comprises a dark-colored cyan ink and a light-colored cyan ink.

17. The ink cartridge according to claim 13, wherein said magenta ink comprises a dark-colored magenta ink and a light-colored magenta ink and said magenta inks each comprise a pigment incorporated therein as a colorant.

18. An ink cartridge comprising a plurality of cyan inks having different densities and other inks received therein integrally or independently at least partly, wherein at least a light-colored cyan ink among said plurality of cyan inks comprises a pigment incorporated therein as a colorant and the other inks having hue different from the cyan inks each comprise a dye incorporated therein as a colorant.

19. The ink cartridge according to claim 18, wherein said light-colored cyan ink comprises C.I. pigment blue 15:3 incorporated therein as a colorant.

20. The ink cartridge according to claim 18, wherein said light-colored cyan ink comprises a pigment and a dye incorporated therein as colorants.

21. An ink cartridge comprising a plurality of magenta inks and cyan inks having different densities and other inks received therein integrally or independently at least partly, wherein at least a light-colored magenta ink and a light-colored cyan ink among said plurality of magenta inks and cyan inks each comprise a pigment incorporated therein as a colorant and the other inks each comprise a dye incorporated therein as a colorant.

22. A recording method for effecting color printing with an ink set comprising a plurality of magenta inks having different densities and other inks of a different hue, wherein at least a light-colored magenta ink among said plurality of magenta inks comprises a pigment incorporated therein as a colorant and said other inks each comprise a dye incorporated therein as a colorant.

23. A recording method for effecting color printing with an ink set comprising a plurality of cyan inks having different densities and other inks of a different hue, wherein at least light-colored cyan ink among said plurality of cyan inks comprises a pigment incorporated therein as a colorant and said other inks each comprise a dye incorporated therein as a colorant.

24. A recording method for effecting color printing with an ink set comprising a plurality of magenta inks and cyan inks having different densities and other ink or inks of a different hue, wherein at least a light-colored magenta ink and a light-colored cyan ink among said plurality of magenta inks and cyan inks each comprise a pigment incorporated therein as a colorant and said other ink or inks each comprise a dye incorporated therein as a colorant.

25. A recorded material obtained by color printing with an ink set comprising a plurality of magenta inks having different densities and other inks of a different hue, wherein at least a light-colored magenta ink among said plurality of magenta inks comprises a pigment incorporated therein as a colorant and said other inks each comprise a dye incorporated therein as a colorant.

26. A recorded material obtained by color printing with an ink set comprising a plurality of cyan inks having different densities and other inks of a different hue, wherein at least a light-colored cyan ink among said plurality of cyan inks comprises a pigment incorporated therein as a colorant and said other inks each comprise a dye incorporated therein as a colorant.

27. A recorded material obtained by color printing with an ink set comprising a plurality of magenta inks and cyan inks having different densities and other ink or inks of a different hue, wherein at least a light-colored magenta ink and a light-colored cyan ink among said plurality of magenta inks and cyan inks each comprise a pigment incorporated therein as a colorant and said other ink or inks each comprise a dye incorporated therein as a colorant.

* * * * *